United States Patent
Taran Katz et al.

(10) Patent No.: US 9,819,850 B2
(45) Date of Patent: Nov. 14, 2017

(54) MODULAR FASHION ACCESSORY

(71) Applicant: SANDISK TECHNOLOGIES INC., Plano, TX (US)

(72) Inventors: Ella Taran Katz, Sunnyvale, CA (US); Yaron Bar, Los Gatos, CA (US); Grace Hina Lee, San Francisco, CA (US); Kyle Nathen Swen, San Carlos, CA (US); Jung Geun Tak, Millbrae, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 103 days.

(21) Appl. No.: 14/678,511

(22) Filed: Apr. 3, 2015

(65) Prior Publication Data

US 2016/0277649 A1   Sep. 22, 2016

Related U.S. Application Data

(60) Provisional application No. 62/133,879, filed on Mar. 16, 2015.

(51) Int. Cl.
*H04N 5/225* (2006.01)
*A45F 5/00* (2006.01)
(Continued)

(52) U.S. Cl.
CPC ......... *H04N 5/2257* (2013.01); *A44C 5/0084* (2013.01); *A44C 15/005* (2013.01);
(Continued)

(58) Field of Classification Search
CPC .. H04N 5/2257; H04N 5/232; H04N 5/23241; H04N 5/2251; H01R 25/00;
(Continued)

(56) References Cited

U.S. PATENT DOCUMENTS

| D166,076 S | 3/1952 | Glaberson |
|---|---|---|
| D170,669 S | 10/1953 | Wagner |

(Continued)

FOREIGN PATENT DOCUMENTS

| EP | 2687939 A1 | 1/2014 |
|---|---|---|
| EP | 2733579 A2 | 5/2014 |
| FR | 2913118 A3 | 8/2008 |

OTHER PUBLICATIONS

International Search Report and Written Opinion of the International Searching Authority (EPO) for International Application No. PCT/US2015/060991, dated Feb. 4, 2016, 19 pages.
(Continued)

*Primary Examiner* — Hung Lam
(74) *Attorney, Agent, or Firm* — Toler Law Group, PC

(57) ABSTRACT

A particular apparatus includes a first electronic component, a second electronic component, and a connecting element that is detachably connectable to the first electronic component and to the second electronic component. The first electronic component is connectable via the connecting element to the second electronic component to form a wearable item. The first electronic component includes a camera, the second electronic component includes an energy storage component, and the first electronic component is configured to receive power from the second electronic component via the connecting element.

34 Claims, 27 Drawing Sheets

(51) Int. Cl.
*A44C 5/00* (2006.01)
*A44C 15/00* (2006.01)
*H01R 13/516* (2006.01)
*H01R 25/00* (2006.01)
*H04N 5/232* (2006.01)
*G03B 17/56* (2006.01)

(52) U.S. Cl.
CPC .............. *A45F 5/00* (2013.01); *G03B 17/56* (2013.01); *H01R 13/516* (2013.01); *H01R 25/00* (2013.01); *H04N 5/2251* (2013.01); *H04N 5/232* (2013.01); *H04N 5/23241* (2013.01); *A45F 2005/006* (2013.01); *A45F 2005/008* (2013.01); *A45F 2200/0533* (2013.01); *G03B 2217/007* (2013.01)

(58) Field of Classification Search
CPC ... H01R 13/516; A44C 15/005; A44C 5/0084; A45F 5/00; A45F 2200/0533; A45F 2005/008; A45F 2005/006; G03B 17/568
See application file for complete search history.

(56) References Cited

U.S. PATENT DOCUMENTS

| | | | |
|---|---|---|---|
| D254,790 S | 4/1980 | Waaske | |
| D299,877 S | 2/1989 | Riley | |
| D304,460 S | 11/1989 | Holterscheidt | |
| D305,370 S | 1/1990 | Williams | |
| D357,703 S | 4/1995 | Chang et al. | |
| 5,608,808 A | 3/1997 | Da Silva | |
| 5,904,149 A | 5/1999 | Ruhl et al. | |
| 6,172,657 B1* | 1/2001 | Kamakura | G02B 27/017 345/4 |
| D460,432 S | 7/2002 | Brown | |
| D461,787 S | 8/2002 | Brown | |
| D467,539 S | 12/2002 | Kataoka | |
| D481,372 S | 10/2003 | Brown | |
| D485,234 S | 1/2004 | Katayama | |
| D488,440 S | 4/2004 | Senda | |
| 6,808,400 B2 | 10/2004 | Tu | |
| D509,790 S | 9/2005 | Sakai | |
| D512,841 S | 12/2005 | Dirks | |
| D520,946 S | 5/2006 | Nasu | |
| D525,583 S | 7/2006 | Vu | |
| D525,616 S | 7/2006 | Andre et al. | |
| D549,707 S | 8/2007 | Depay | |
| D556,196 S | 11/2007 | Cheng | |
| 7,438,410 B1* | 10/2008 | Howell | G02C 11/00 351/158 |
| D589,626 S | 3/2009 | Petersen | |
| 7,542,665 B2* | 6/2009 | Lei | G02B 27/0093 348/333.03 |
| D596,160 S | 7/2009 | Andre et al. | |
| D609,213 S | 2/2010 | Yeo | |
| D617,911 S | 6/2010 | Freeman et al. | |
| 7,810,750 B2 | 10/2010 | Abreu | |
| D633,476 S | 3/2011 | Andre et al. | |
| 7,933,117 B2 | 4/2011 | Howarth et al. | |
| D638,831 S | 5/2011 | Paradise | |
| D662,491 S | 6/2012 | Andre et al. | |
| D666,025 S | 8/2012 | Cobbett et al. | |
| 8,370,998 B2 | 2/2013 | Han et al. | |
| D680,571 S | 4/2013 | Fisher et al. | |
| D681,647 S | 5/2013 | Choi | |
| D690,137 S | 9/2013 | Kikkert et al. | |
| D690,138 S | 9/2013 | Kikkert et al. | |
| D711,956 S | 8/2014 | Adams | |
| D713,399 S | 9/2014 | Green | |
| D721,737 S | 1/2015 | Ahn et al. | |
| 8,994,827 B2 | 3/2015 | Mistry et al. | |
| 9,011,292 B2 | 4/2015 | Weast et al. | |
| D742,874 S | 11/2015 | Cheng et al. | |
| D748,624 S | 2/2016 | Magi | |
| D756,333 S | 5/2016 | Smith et al. | |
| 2006/0017839 A1* | 1/2006 | Sawachi | H04M 1/72527 348/372 |
| 2006/0023158 A1* | 2/2006 | Howell | G02C 11/06 351/41 |
| 2013/0033610 A1* | 2/2013 | Osborn | H04N 5/2258 348/207.1 |
| 2013/0310658 A1* | 11/2013 | Ricks | A61B 5/1118 600/301 |
| 2014/0054346 A1 | 2/2014 | Ledesma | |
| 2014/0116085 A1 | 5/2014 | Lam | |
| 2014/0139637 A1 | 5/2014 | Mistry et al. | |
| 2014/0160248 A1 | 6/2014 | Pomerantz et al. | |
| 2014/0160250 A1 | 6/2014 | Pomerantz et al. | |
| 2015/0199063 A1* | 7/2015 | Algreatly | G06F 3/0416 348/169 |
| 2016/0154578 A1* | 6/2016 | Luo | G06F 3/04847 715/765 |

OTHER PUBLICATIONS

Restriction Requirement dated Aug. 18, 2016 in U.S. Appl. No. 29/520,600, 6 pages.
Restriction Requirement dated Feb. 17, 2016 in U.S. Appl. No. 29/520,598, 6 pages.

* cited by examiner

MODULAR FASHION ACCESSORY

CROSS-REFERENCE TO RELATED APPLICATIONS

The present application claims benefit of U.S. Provisional Application No. 62/133,879 filed Mar. 16, 2015, which is incorporated by reference herein in its entirety.

FIELD OF THE DISCLOSURE

The present disclosure is generally related to modular wearable fashion accessories.

BACKGROUND

Advances in technology have resulted in compact portable electronic devices. Portable electronic devices have been configured to be mounted to one or more wearable accessories. For example, a portable electronic device has been incorporated into a headgear or a harness that enables a user to wear the portable electronic device. However, such wearable accessories are often bulky (e.g., cumbersome) and/or are not aesthetically pleasing, which may deter use of the wearable accessory.

DETAILED DESCRIPTION

Figure 1:
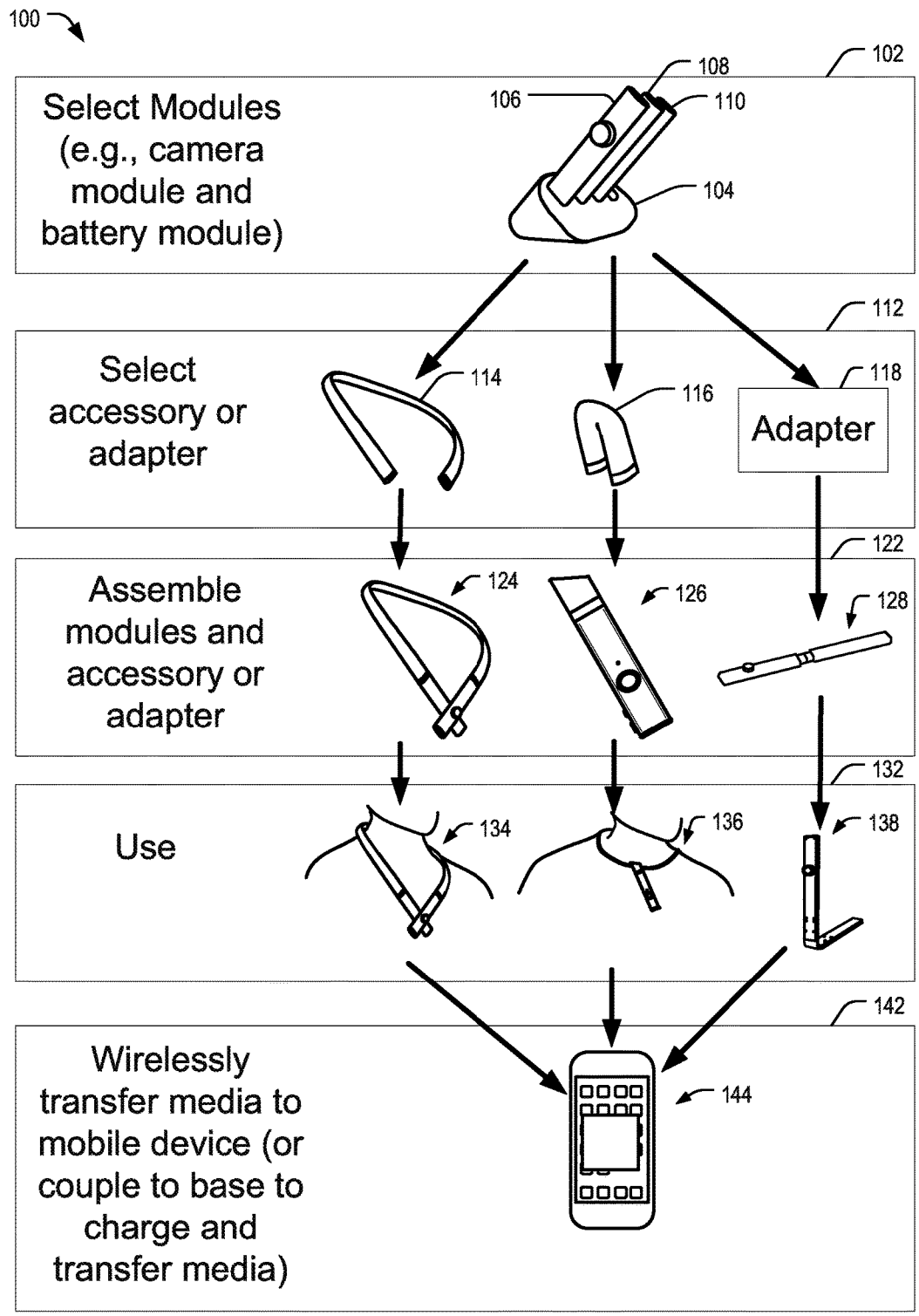
FIG. 1 illustrates activities associated with use of a modular fashion accessory and related components.

Referring to FIG. 1, an illustration depicting components of a modular fashion accessory and use of the modular fashion accessory is depicted and generally designated 100. A selection 102 may be made to select one or more modules of the modular fashion accessory. For example, a camera module 106 and a first battery module 108 may be selected from a charging device 104 that is coupled to the camera module 106, to the first battery module 108, and to a second battery module 110.

A selection 112 may be made of an accessory or an adapter for the selected modules. For example, a flexible band 114 having a first length may be selected to connect the selected modules. As another example, a flexible band 116 having a second length that is shorter than the first length may be selected. As a third example, an adapter 118 may be selected that is configured to connect the selected modules to each other.

An assembly 122 of the selected modules and the selected accessory or adapter may be performed. In a first example, when the flexible band 114 with the first length is selected, the camera module 106 and the battery module 108 may be connected to the flexible band 114 to result in a wearable item having a necklace configuration 124. As another example, when the flexible band 116 having the second length is selected, the camera module 106 and the battery module 108 may be connected to the flexible band 116 to form a wearable item having a clip configuration 126. As another example, when the adapter 118 is selected, the camera module 106 may be coupled to the battery module 108 via the adapter 118 in a "stick" configuration 128 or in another configuration, such as an "L"-shaped configuration.

A use 132 of the assembled modular fashion accessory may include wearing the modular fashion accessory having the necklace configuration 124 around a neck of wearer, such as depicted in a first example 134. Alternatively, the modular fashion accessory having the clip configuration 126 may be worn, clipped to an article of clothing of a wearer, such as at a shirt collar, as illustrated in a second example 136. As another alternative, the modular fashion accessory having the stick configuration 128 or an "L"-shape configuration may be used, such as by placing the modular fashion accessory on a table-top or in another position, such as in a shirt pocket, a pant pocket, or one or more other locations, as illustrated in a third example 138. As illustrated, examples of a fashion accessory include, but are not limited to, a necklace, a clip, a keychain-style purse accessory, a stick-type accessory, and an L-shaped accessory.

The modular fashion accessory may be configured to wirelessly receive commands from a remote device (e.g. a mobile phone or tablet computer) and to wirelessly transfer media (e.g., video, images, or audio) to the remote device. A wireless transfer 142 may be initiated by a wearer (or a user) of the modular fashion accessory via an application at a remote electronic device, such as an application executing at the user's smartphone 144. The application may enable the user to control one or more camera settings, such as a focus, a resolution, an activation or deactivation state of the camera, or one or more other settings, and to transfer audio and/or video data from the modular fashion accessory to the mobile device 144. For example, video and audio data captured by one or more cameras and/or microphones of the modular fashion accessory may be streamed via a wireless network, such as via an Institute of Electrical and Electronics Engineers (IEEE) 802.11-type network (e.g., Wi-Fi), from the camera module 106 to the mobile device 144.

By including an electronic device in a stylish modular fashion accessory, audio and/or video recording of a user's environment may be enabled while maintaining a professional and/or fashionable appearance by a wearer of the modular fashion accessory. For example, the modular fashion accessory may be used by a person participating in a recording session, such as a "life blogger," by a wearer that may anticipate an encounter that the wearer wishes to record, such as an encounter with relatives at a reunion or party, or a planned business meeting, as illustrative, non-limiting examples. Wireless transfer of streaming media or media files to a remote device may enable sharing of such recorded content via social networking or other file or data sharing systems. The fashion accessory may also include touch sensors to enable a wearer to indicate keyframes or to generate metadata during a recording operation to assist in management, searching, editing, etc. of the recorded media content. The modular arrangement of components of the fashion accessory enables selection of multiple possible configurations, such as the necklace configuration 124, the clip configuration 126, the stick configuration 128, or the L-shaped configuration shown in the third example 138, as examples of numerous possible configurations. As a result of the configurability of the modular fashion accessory, the modular fashion accessory may be appropriate for use for both men and women in a variety of settings.

Figure 2:
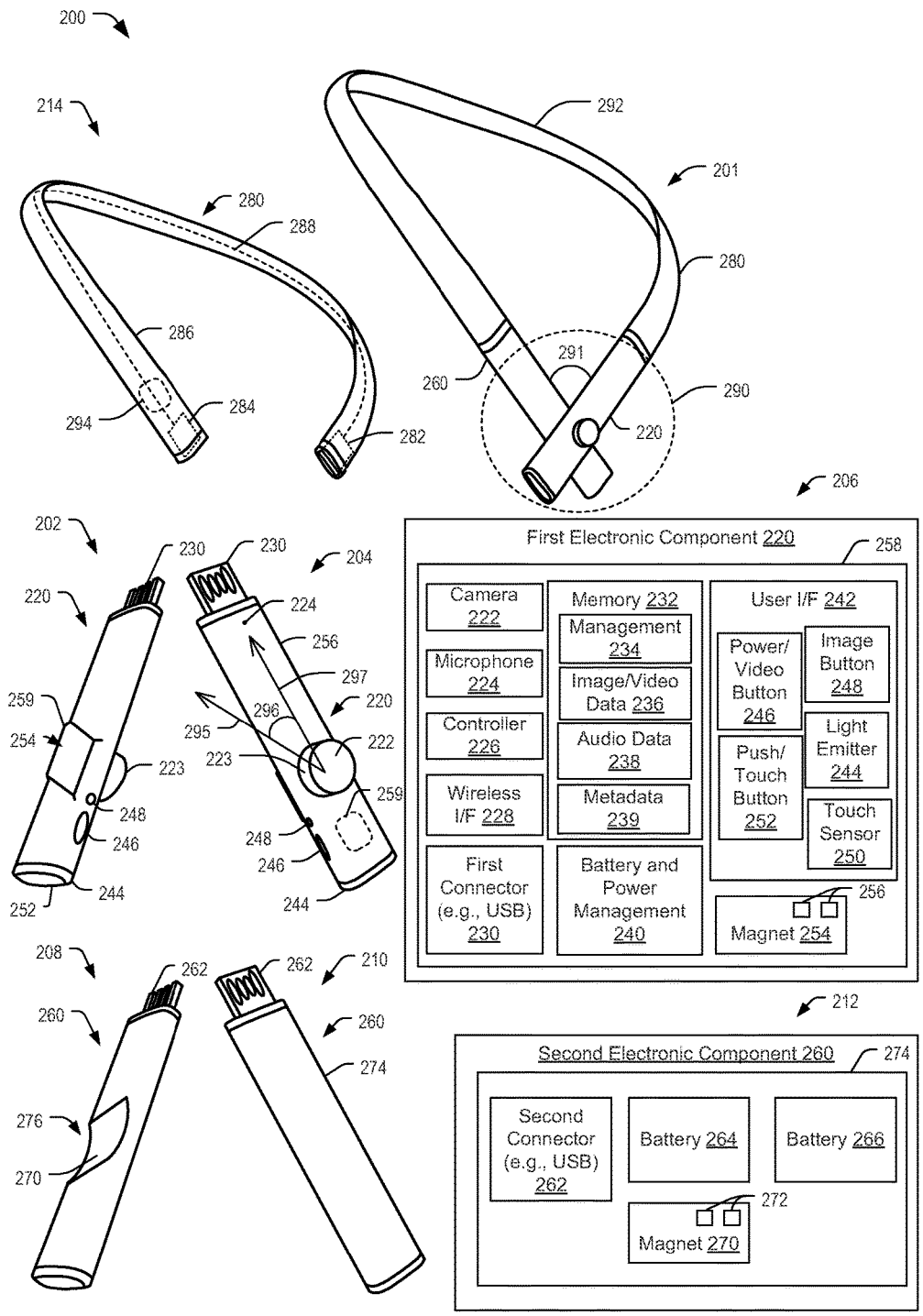
FIG. 2 is a diagram of a particular illustrative embodiment of a modular fashion accessory having a necklace configuration.

Referring to FIG. 2, an illustrative example of the modular fashion accessory is depicted and generally designated 200. The modular fashion accessory is depicted as a wearable item 201 having the necklace configuration 124 of FIG. 1 and formed of components including a first electronic component 220 (e.g. the camera module 106 of FIG. 1), a second electronic component 260 (e.g. the first battery module 108 of FIG. 1), and a connecting element 280 (e.g. the flexible band 114 having the first length of FIG. 1). For example, the first electronic component 220 may include a camera, the second electronic component 260 may include an energy storage component, and the connecting element 280 may be a wearable connecting element. The second electronic component 260 may include a connector (e.g., a second connector 262) configured to be detachably coupled to the first electronic component 220 (e.g., a wearable camera component) via the connecting element 280 (e.g., a wearable connecting element) to provide energy from the second electronic component 260 (e.g., an energy storage component) to the first electronic component 220. The first electronic component 220 (e.g., a wearable camera component) may include a connector (e.g., a first connector 230) configured to be detachably coupled to the second electronic component 260 (e.g., a power source or an energy storage component) via the connecting element 280 (e.g., a wearable connecting element). A first view 202 illustrates a first perspective view of a particular embodiment of the first electronic component 220. A second view 204 illustrates a second perspective view of the first electronic component 220. A block diagram 206 illustrates components that may be included in the first electronic component 220. A third view 208 illustrates a first perspective view of the second electronic component 260. A fourth view 210 illustrates a second perspective view of the second electronic component 260. A second block diagram 212 illustrates components that may be included in the second electronic component 260. A fifth view 214 illustrates a perspective view of the connecting element 280 and depicts components that may be included in the connecting element 280.

The first electronic component 220 may include a camera 222, a microphone 224, a controller 226, a wireless interface 228, and the first connector 230, such as a Universal Serial Bus (USB)-type connector. In some implementations, the first connector 230 may be a USB connector. In some implementations, the first connector 230 may have a form factor that is not compliant with a USB specification. A memory 232 in the first electronic component 220 may include a management module 234, image and/or video data 236, audio data 238, and metadata 239. The memory 232 may also store data and executable instructions such as firmware and configuration register contents, as illustrative, non-limiting examples. The first electronic component 220 may also include a battery and power management module 240, such as a dedicated circuit or a controller configured to manage power usage and battery state. The first electronic component 220 also includes a user interface (I/F) 242. The user interface 242 may include one or more components, such as a power/video button 246, a light emitter 244, such as a light ring that at least partially wraps around a decorative housing 258 of the first electronic component 220, an image button 248, a push/touch button 252, and a touch sensor 250. A magnet 254 that includes one or more poles 256 may be configured to enable the first electronic component 220 to be attached to the second electronic component 260 via magnetic attraction.

The second electronic component 260 may include the second connector 262, such as a USB-type connector, and one or more energy storage components, such as a first battery 264 and a second battery 266. In some implementations, the second connector 262 may be a USB connector. In some implementations, the second connector 262 may have a form factor that is not compliant with a USB specification. The second electronic component 260 may also include a magnet 270 that includes one or more magnetic poles 272 that may be configured to enable the second electronic component 260 to magnetically couple to the first electronic component 220, such as via magnetic fields between the magnet 254 of the first electronic component 220 and the magnet 270 of the second electronic component 260. The second electronic component 260 may include a decorative housing 274 which, in conjunction with the decorative housing 258 of the first electronic component 220, provide a stylish appearance to the modular fashion accessory.

As illustrated, the first electronic component 220 is connectable via the connecting element 280 to the second electronic component 260 to form the wearable item 201. In a particular example, at least one of the first electronic component 220 or the second electronic component 260 includes a camera. To illustrate, the first electronic component 220 is illustrated as including the camera 222. The wearable item 201 includes a fashion accessory, illustrated as a fashion accessory forming a necklace having the necklace configuration 124. The necklace includes a pendant 290 coupled to a flexible band 292. The pendant 290 may be formed by the first electronic component 220 magnetically attached to the second electronic component 260, and the flexible band 292 may be formed of the connecting element 280.

A first exterior surface of the first electronic component 220 may include a reflective material. For example, the decorative housing 258 of the first electronic component 220 may have a reflective outer surface. To illustrate, the reflective material may be metallic. In some implementations, the first exterior surface of the first electronic component includes one of, or a combination of, rigid and semi-rigid materials. The rigid and semi-rigid materials may include a reflective surface material. The reflective material may be one or a combination of plastic and metallic materials.

The flexible band 292 may include leather. For example, the connecting element 280 may include a cover 286 that encloses wiring 288 that interconnects a third connector 282 and a fourth connector 284. Alternatively, or in addition, the flexible band may 292 include another material, such as one or more elastomers. In a particular implementation, the wiring 288 may include one or more conductive wires, one or more conductive cables, or a combination thereof, that are configured to electrically couple the third connector 282 to the fourth connector 284. The third connector 282 may be configured to connect to the first connector 220, and the fourth connector 284 may be configured to connect to the second connector 230 of the second electronic component 260.

The cover 286 may be made of, or covered in, leather. In the necklace configuration of the wearable item 201, the first electronic component 220 is configured to physically attach to the second electronic component 260 to form the pendant 290 of the necklace. The flexible band 292 is dimensioned (e.g., may have a sufficient length) to extend between the first and second electronic components 220, 260 and wrap around the back of a wearer's neck. While worn, the flexible band 292 may suspend the pendant 290 at a chest of the wearer.

Although FIG. 2 depicts the wearable item 201 as having a necklace configuration, one or more other configurations may be formed and used. For example, the modular fashion accessory may include a bracelet, such as described in further detail with respect to FIG. 4. As another example, the modular fashion accessory may include a clip, such as in the clip configuration 126 of FIG. 1. An example of a clip configuration is described in further detail with respect to FIG. 3. In another implementation, the modular fashion accessory may include a keychain-style purse accessory, such as described in further detail with respect to FIG. 5. As another example, the modular fashion accessory may include or communicate with an electronic watch.

As illustrated, the first electronic component 220 is configured to fasten to the second electronic component 260 to form a cross-type shape. For example, the first electronic component 220 may be configured to fasten to the second electronic component 260, and the first and second electronic components 220, 260 may be angled relative to each other when the first electronic component 220 is fastened to the second electronic component 260. For example, an angle 291 formed between the first electronic component 220 and the second electronic component 260 may be less than 90 degrees. In a particular implementation, the angle 291 formed between the first electronic component 220 and the second electronic component 260 may be substantially 60 degrees. A degree of intersection of the first electronic component 220 and the second electronic component 260 being less than 90 degrees, and in some implementations being substantially 60 degrees, may provide a stylish fit and a comfortable configuration that enables the flexible band 292 to drape around the back and sides of the wearer's neck and to extend to the user's chest without uncomfortable contact with or "kinking" at the wearer's collarbones, such as described in further detail with respect to FIG. 12.

The first electronic component 220 or the second electronic component 260 may include an antenna and communications circuitry configured to wirelessly transfer data (e.g., media data) from the wearable item 201 to an electronic device. For example, the first electronic component 220 may include the wireless interface 228 that is coupled to an antenna 229. Communications circuitry in the wireless interface 228 coupled to the antenna 229 may be configured to wirelessly transfer media data from the first electronic component 220 to a remote device, such as the mobile device 144 of FIG. 1. For example, the wireless interface 228 may include one or more modulator-demodulators (modems), mixers, filters, amplifiers, and/or other components to enable sending and receiving of wireless transmissions via the antenna 229. The wireless interface 228 may include one or more protocol stacks to enable encoding/decoding and formatting of wireless communications to communicate via one or more types of wireless network technologies, such as via an IEEE 802.11-type network, an ad-hoc peer-to-peer network (e.g., a Bluetooth-type network), a wireless voice and/or data network such as a Long Term Evolution (LTE)-type network, a Code Division Multiple Access (CDMA)-type network, and/or a Global System for Mobile Communications (GSM)-type network, as illustrative, non-limiting examples.

The media data may include image data (e.g., still images and/or video data such as the video image data 236) captured by the camera 222, audio data, such as audio data 238 (e.g., voice data) captured by the microphone 224, metadata (e.g., the metadata 239) associated with image data and/or audio data, one or more other types of data (e.g., sensor data, such as from a gyroscopic sensor, from a global positioning system (GPS) sensor, from a magnetic field sensor, from an accelerometer, and/or from one or more other sensors that may be included in the first or second electronic device 220, 260), or a combination thereof. The communication circuitry may be configured for use with command, control, monitoring, and configuration of the first and/or second electronic components 220, 260. For example, communication circuitry including the wireless interface 228 may further be configured to receive control data from the electronic device (e.g., the mobile device 144 of FIG. 1) and to provide the control data to the controller 226. The controller 226 may be configured to control operation of the camera 222 in response to the control data. Interaction between a remote device providing camera operation commands to the wearable item 201 and wireless transfer of stored data or real-time (or near real-time) streaming of captured audio and/or video data to the mobile device is described in further detail with respect to FIGS. 26-27.

As illustrated in FIG. 2, the first electronic component 220 is configured to couple to the second electronic component 260 via connection of the first connector 230 to the third connector 282 and connection of the second connector 262 to the fourth connector 284 in a first configuration (e.g., the necklace configuration 124). However, the modularity of the stylish fashion accessory enables alternate connections to form alternate configurations. For example, in a second configuration, the first electronic component 220 may be configured to couple the second electronic component 260 via connection of the first connector 230 to the second connector 262. To illustrate, one of the first connector 230 and the second connector 262 may be a male-type connector, and the other of the first connector 230 and the second connector 262 may be a female-type connector, such that the first connector 230 may be directly connected to the second connector 262 such as in a "stick"-type configuration. An example of a stick configuration is depicted in further detail with respect to FIG. 6. In other configurations, an adapter, such as the adapter 118 of FIG. 1, may be used to couple the first electronic component 220 to the second electronic component.

The modularity of the modular fashion accessory may also enable connection of the electronic components 220, 260 to one or more connectors of a charging device, such as by connecting the first connector 230 to a fifth connector of a charging device and connecting the second connector 262 to a sixth connector of a charging device. The charging device may be plugged into a power outlet. Examples of charging devices are depicted and described in further detail with respect to FIGS. 7, 8, and 16. In another example of the modularity enabling other configurations, the first electronic component 220 may be configured to couple to the second electronic component 260 by connecting the first connector 230 and the second connector 262 to an adapter that is configured to hold the first electronic component 220 and the second electronic component 260 in an L-shaped configuration, such as described in further detail with respect to FIG. 9. As another example, the adapter may be configured to hold the first electronic component 220 and the second electronic component 260 in a linear configuration, such as the stick configuration 128 illustrated in FIG. 1.

The camera 222 may include a digital camera that may include one or more light sensitive sensors, such as a charge-coupled device (CCD) or one or more other types of light detecting sensors. Alternatively or in addition, the camera 222 may be configured to detect electromagnetic radiation having one or more frequencies that are outside of the human visible spectrum, such as by including an infrared (IR) and/or ultraviolet (UV) sensor. The camera 222 may be operable to perform image capture via one or more lenses, such as a lens in a lens housing 223 that projects from the first electronic component 220. The camera 222 may be configured to initiate a still image capture (e.g. a snapshot) in a first mode, and to perform a video image capture (e.g. a streaming video or video recording) operation in a second mode.

The camera 222 may be responsive to the controller 226 and may adjust one or more camera parameters or operations responsive to instructions from the controller 226. For example, the camera 222 may be responsive to the controller 226 to perform a power on/off operation, an activation/deactivation operation, an auto-focus operation, an auto white balance operation, an image capture mode operation, "a view finder" mode operation, one or more other operations, or any combination thereof, as illustrative, non-limiting examples.

The microphone 224 may be embedded in the decorative housing 258 or may be enclosed by the decorative housing 258 and in communication with an exterior of the first electronic component 220 via one or more ports or holes through the decorative housing 258. Operation of the microphone 224 (e.g., activation/deactivation, gain, etc.) may be responsive to one or more control signals received from the controller 226. Alternatively, or in addition, operation of the microphone 224 may be responsive to sound (e.g., may automatically activate in response to detecting sound).

The controller 226 may include one or more processing components, such as a processor core configured to execute instructions to control operations at the first electronic component 220. For example, the controller 226 may be configured to execute the management module 234 which may be stored in the memory 232. The controller 226 may be responsive to inputs received via the user interface 242 and/or via the wireless interface 228, such as from an application executing at a remote device. For example, the controller 226 may be responsive to inputs received from a mobile device via the wireless interface 228 to operate in a "nanny-cam" mode, such as described in further detail with respect to FIG. 7.

The memory 232 may be embedded within the first electronic component 220, such as in accordance with a Joint Electron Devices Engineering Council (JEDEC) Solid State Technology Association Universal Flash Storage (UFS) configuration. Alternatively, the memory 232 may be removable from the first electronic component 220 (i.e., "removably" coupled to the first electronic component 220). As an example, the memory 232 may be removably coupled to the first electronic component 220, such as in accordance with a removable memory card configuration.

The camera 222 may be aligned (e.g., have an axis 295 of alignment) at an angle 296 from a long axis 297 of the first electronic component 220. For example, as illustrated in the wearable item 201, when worn in the necklace configuration, the long axis 297 of the first electronic component 220 may be maintained at a substantially 30 degree angle from vertical (e.g., upwards, perpendicular from the horizon). As a result of the non-vertical (i.e., not extending in a line upward from and normal to the surface of the Earth) orientation, an angular orientation of the camera 222 may be adjusted such that image capture performed by the camera 222 when worn in the necklace configuration may have image edges that substantially align with a horizontal direction and a vertical direction from the perspective of a standing wearer. For example, the angular rotation of the camera 222 (e.g., the angle 296), such as caused by a rotation of the sensor or the lens housing 223 of the camera 222, may be configured such that when image capture is performed while the first electronic component 222 is angled at substantially 30 degrees from vertical (e.g., the long axis 297 is at 30 degrees from vertical), the image capture results in an image that is substantially aligned to vertical and horizontal directions (i.e., two edges of an image are substantially aligned with a vertical direction and the other two edges of the image are substantially aligned with a horizontal direction). In some implementations, an angular orientation of the camera 222 may be adjustable, such as by rotation of a rotatable lens housing 223. In other implementations, an angular orientation of the camera 222 (e.g., the angle 296) may be fixed.

The light emitter 244 may include a light emitting device, such as a light emitting diode (LED) device. The light emitting device may include a light ring, such as a ring that may encircle or at least partially encircle the decorative housing 258 at a bottom end of the first electronic component 220 (e.g., at an end opposite to an end that includes the connector 230). In some implementations, the light emitter 244 may be configured to provide visual information regarding operation of the first electronic component 220. For example, the light emitter 244 may illuminate to indicate that an audio and/or video recording is ongoing. In other implementations, an illumination behavior of the light emitter 244 may be controlled by the controller 226 according to one or more operations that may be ongoing at the camera 222. For example, the light emitter 244 may be configured to adjust a display of a visual indicator (e.g. adjust illumination) to correspond to an indication of receipt of wireless commands, an indication of data transfer of image and/or audio data captured by the camera 222 and/or the microphone 224, an indication of a battery or stored energy level, an indication of one or more other operations that may be performed at the first electronic component 220, or any combination thereof.

The power/video button 246 may include a single depressible mechanical button that projects from the decorative housing 258 and may be actuated by, for example, a user's finger. The power/video button 246 may be configured to change an activation status of the first electronic device 220 between a powered on state and a powered off state in response to detecting a prolonged press of the power/video button 246. In addition, or alternatively, the power/video button 246 may be configured to initiate a start and/or a stop of a video capture operation at the camera 222 in response to detecting a brief actuation of the power/video button 246. Thus, a wearer of the wearable item 201 may press and hold the power/video button 256 to power the first electronic component 220 on or off, and the user may briefly depress or tap the power/video button 246 to initiate a video capture operation or to end a video capture operation. Although the power/video button 246 is described as a single mechanical structure that is configured to receive two different types of user input, in other embodiments, power state adjustment and video recording state adjustment may be signaled by the wearer via actuation of separate control buttons, such as in an implementation where the first electronic component 220 has a power button that is separate from a video button and each button may be independently actuated by a wearer of the wearable item 201.

When the image button 248 is actuated (e.g., pressed by a wearer) the image button 248 may generate a signal to the controller 226 that indicates to the controller 226 that a still image capture operation is to be performed at the camera 222. For example, the image button 248 may operate in a similar manner as a shutter-click button of a camera device. The controller 226 may be responsive to receiving an input signal from the image button 248 to perform a single image capture operation at the camera 222.

The touch sensor 250 may be responsive to detecting a physical contact or near-contact (e.g. close proximity) to the touch sensor 250. For example, the touch sensor 250 may include a capacitive sensor. The touch sensor 250 may be configured to provide a signal to the controller 226 responsive to detecting user input at the touch sensor 250. The first electronic component 220 may be responsive to the signal from the touch sensor 250 by initiating an operation at the camera 222.

For example, the operation initiated at the camera 222 responsive to the signal from the touch sensor 250 may include an image capture operation at the camera 222. As another example, the operation that is initiated at the camera 222 may include storage of captured image data received from the camera 222. For example, in some implementations, the camera 222 may operate in a continuous image capture mode, such as in a view finder mode, that retains the most recently captured image data without providing image data for long term storage at the memory 232. In response to detection of the signal from the touch sensor 250, such as when a user taps the touch sensor 250 in response to an observance of an event that the user wishes to record, the controller 226 may be configured to cause recently captured images from the camera 222 to be stored to the memory 232. For example, a five-second or a ten-second time range of image capture data that immediately precedes and/or that immediately follows detection of the signal from the touch sensor 250 may be stored to the memory 232 (e.g. as the image/video data 236).

Alternatively, or in addition, an operation initiated at the camera 222 responsive to the signal from the touch sensor 250 may include storing metadata associated with captured image data. For example, the metadata may identify the captured image data as a keyframe and may be stored as the metadata 239. In some implementations, the first electronic component 220 may be configured to generate the metadata 239 to insert a tag into a video data stream responsive to a signal from the capacitive touch sensor 250. For example, the video data stream may be generated based on data received from the camera 222 and may be sent to a remote device, such as via wireless transmission of encoded video data via the wireless interface 228 and the antenna 229.

The controller 226 may be configured to detect activation of the touch sensor 250 and to generate tag data, such as in the metadata 239, responsive to activation of the touch sensor 250. The tag data may include a timestamp corresponding to the touch sensor 250 being in an active state (e.g., when a user engages the touch sensor 250). The tag data (e.g., the metadata 239) may be attached to (e.g., stored at a particular location of the video data) or may be stored at the memory 232 separate from the image/video data 236. The tag data may be configured to index the image/video data 236. For example, a user may activate the touch sensor 250 during video capture to indicate (e.g., tag) a specific moment of the image/video data 236.

The image/video data 236 may be processed by an application, such as a video processing application. For example, the application may be included in an electronic device, such as the mobile device 144 of FIG. 1. A user may use the application to review, edit, and/or share one or more portions of the image/video data 236. In some implementations, the image/video data 236 may be searchable based on the tag data. For example, the image/video data 236 may be indexed according to the tag data and an application may access the tag data and navigate to one or more portions of the image/video data 236 that correspond to the tag data.

The touch sensor 250 may be included as part of, or attached to, a radio-frequency transmission window 259, such as a plastic Wi-Fi window, that at least partially encloses the antenna 229. For example, when the decorative housing 258 includes metallic material, such as a metallic outer surface, the radio-frequency transmission window 259 may cover an opening in the decorative housing 258 to provide a signal propagation path that is not obstructed by conducting materials to enable sending and receipt of radio-frequency transmissions via the antenna 229. The antenna 229 may be disposed within the decorative housing 258 behind the radio-frequency transmission window 259 (e.g., a portion of the antenna 259 may be covered by the radio-frequency transmission window 259 and not by the decorative housing 258). The radio-frequency transmission window 259 may be decorative and configured to substantially match or fashionably complement a style and appearance of the decorative housing 258. Examples of configurations of radio-frequency transmission windows are illustrated and described with respect to FIG. 25.

The push/touch button 252 may be included at a second end of the first electronic component 220, where the connector 230 is located at a first end of the first electronic component 220 that is opposite to the second end. The push/touch button 252 may include a capacitive touch sensor and may be configured to generate a first signal in response to detecting a touch at the push/touch button 252. The push/touch button 252 may be configured to generate a second signal in response to detecting a push of the push/touch button 252. To illustrate, the push/touch button 252 may be configured to send the second signal indicating a push or actuation of the push/touch button 252 to the controller 226, while a contact with the push/touch button that does not depress the push/touch button 252 beyond a threshold distance may result in the first signal indicating a touch of the push/touch button 252 to be sent to the controller 226. The first electronic component 220 may be configured to perform a first operation in response to the first signal and to perform a second operation in response to the second signal. For example, the first operation may correspond to a keyframe mark or metadata insertion operation into a video feed from the camera 222, while the second operation may correspond to activation or deactivation of a video capture mode of the camera 222. In other implementations, other operations may be associated with the first signal and the second signal of the push/touch button 252.

The first electronic component 220 and the second electronic component 260 may be held in a particular orientation when attached by at least one of the magnet 254 and the magnet 270. For example, at least one of the first electronic component 220 or the second electronic component 260 includes a magnet having a shape and magnetic poles arranged to maintain a particular angle of the housing 258 of the first electronic component 220 and the housing 274 of the second electronic component 260 during use of the wearable item 201 in a first configuration. To illustrate, the magnet 254 may have a shape and magnetic poles 256 arranged to maintain a particular angle (e.g., the angle 291) between the decorative housing 258 and the decorative housing 274 while the wearable item 201 is worn in the necklace configuration illustrated in FIG. 2. The particular angle may correspond to the angle 291 at which the long axis 297 of the first electronic component 220 intersects a long axis of the second electronic component 260, illustrated in FIG. 2 as approximately a 60 degree angle.

The shape and magnetic poles of the magnet (e.g., the shape and magnetic poles 256 of the magnet 254 and/or the shape and magnetic poles 252 of the magnet 270) may be arranged to maintain the housing 258 substantially parallel to the housing 274 during use of the wearable item in a second configuration, such as in the clip configuration 126 of FIG. 1. In addition to, or alternatively to, the shape and the arrangement of the magnetic poles 256 and 272, the decorative housing 258 of the first electronic component 220 may include a protrusion 259 corresponding to a position of the magnet 254, and the decorative housing 274 of the second electronic component 260 may include a recess 276 that is dimensioned and configured to accommodate insertion of the protrusion 259. For example, the protrusion 259 and the recess 276 may both be substantially circular and, along with radially symmetric positioning of the poles 256, 272, may enable magnetic attachment at substantially any angular orientation between the decorative housings 258 and 274. In other implementations, the protrusion 259 and/or the recess 276 may include one or more shapes configured to permit attachment of the electronic components 220, 260 to each other in some orientations and to prohibit attachment of the components 220, 260 to each other in other orientations.

In addition to the user interface 242 and the wireless interface 228, the first electronic component 220 may be responsive to one or more other environmental conditions or inputs by the wearer of the wearable item 210 to control one or more operations at the first electronic component 220. For example, a user may reconfigure the components 220, 260 while worn in another pendant configuration so that the second component 260 covers the camera lens, causing the first electronic component 220 to deactivate the camera 222.

The second electronic component 260 may be configured to detect a connection of the second connector 262 to a mating connector and to provide energy to a connected device via one or more of the energy storage components (e.g., the batteries 264-266) or to initiate a charging (or energizing) operation of one or more of the energy storage components (e.g., the batteries 264-266) to charge (or energize) the one or more of the energy storage components. For example, when the second electronic component 260 is detected as being connected to a mating connector at a charging device, the second electronic component 260 may be configured to initiate charging of one or more of the batteries 264-266. Alternatively, in response to detection that the second connector 262 is connected to a non-charging electronic device, such as connected to the first electronic component 220 via the flexible band 292, the second electronic component 260 may be configured to provide power to the first electronic component 220 via the second connector 262.

The connecting element 280 may include the cover 286 that at least partially encloses the third connector 282 at one end and the fourth connector 284 at the other end. For example, the connecting element 280 may include a rigid material in some embodiments, a semi-rigid material in other embodiments, or a flexible material in still other embodiments. In some implementations, the connecting element 280 may include a pressure sensor 294. The connecting element 280 may be configured to provide an indication of actuation of the pressure sensor 294, such as a squeeze of the pressure sensor 294 by the wearer of the wearable item 201, to the first electronic component 220 via the fourth connector 284. Receipt of the signal from the pressure sensor 294 may cause the first electronic component 220 to initiate a camera operation. To illustrate, the wearer of the wearable item 201 may squeeze a portion of the connecting element 280 to actuate the pressure sensor 294 and to cause the first electronic component 220 to initiate the camera operation, such as to initiate a still photograph capture, to initiate or to end a video recording operation, to insert a metadata tag into a video stream, to perform one or more operations, or any combination thereof.

Figure 3:
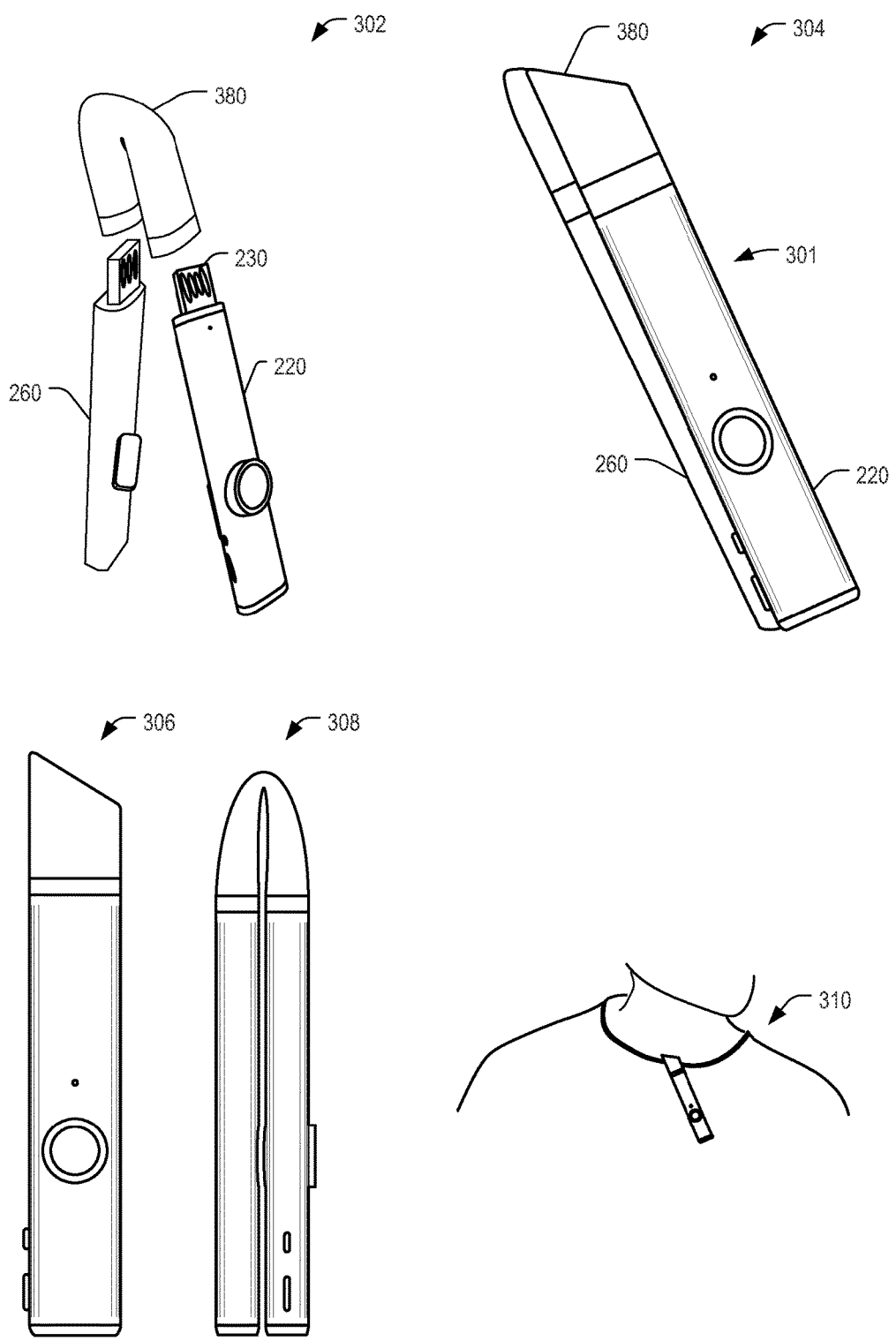
FIG. 3 is a diagram of another particular illustrative embodiment of a modular fashion accessory having a clip configuration.

FIG. 3 illustrates several views of the modular fashion accessory in the clip configuration 126 of FIG. 1. A first perspective view 302 illustrates modular components of the fashion accessory in an exploded (e.g., non-connected) arrangement. The first electronic component 220 is connectable via the first connector 230 to a connecting element 380. The connecting element 380 may include a flexible band that has a second length that is shorter than the length of the connecting element 280 of FIG. 2 (i.e., a shorter band may be used in the clip configuration 126 of FIG. 1 as compared to the necklace configuration 124 of FIG. 1). Alternatively, the connecting element 380 may include a clip (e.g., a clip including a spring-biased hinge). The second electronic component 260 is connectable to the connecting element 380 via the second connector 262.

A second perspective view 304 illustrates components of the modular fashion accessory assembled into the clip configuration to form a wearable item 301 (e.g., the stylish fashion accessory includes a clip). The clip is formed via a connection of the first electronic component 220 and the second electronic component 260 to the connecting element 380. In some implementations, magnets of one or more of the components 220, 260 may hold the clip in a closed configuration via magnetic attraction. In other implementations, the connecting element 380 may be a rigid or semi-rigid element that holds the first electronic component 220 against and proximate to the second electronic component 260 in the clip configuration. A third view 306 provides a front view of the wearable item 301 having the clip configuration. A fourth view 308 illustrates a side view of the wearable item 301 having the clip configuration. A fifth view 310 illustrates the wearable item 301 having the clip configuration being worn as a stylish fashion accessory including a camera. As illustrated in the fifth view 310, the clip may be attached to a collar of a wearer's shirt to be suspended substantially at the wearer's chest. In other implementations, the wearable item having the clip configuration may be clipped to one or more other items, such as a lapel, a belt, a waistband, a shirt pocket, a hat brim, one or more other items to which a clip may be applied, or any combination thereof.

Figure 4:
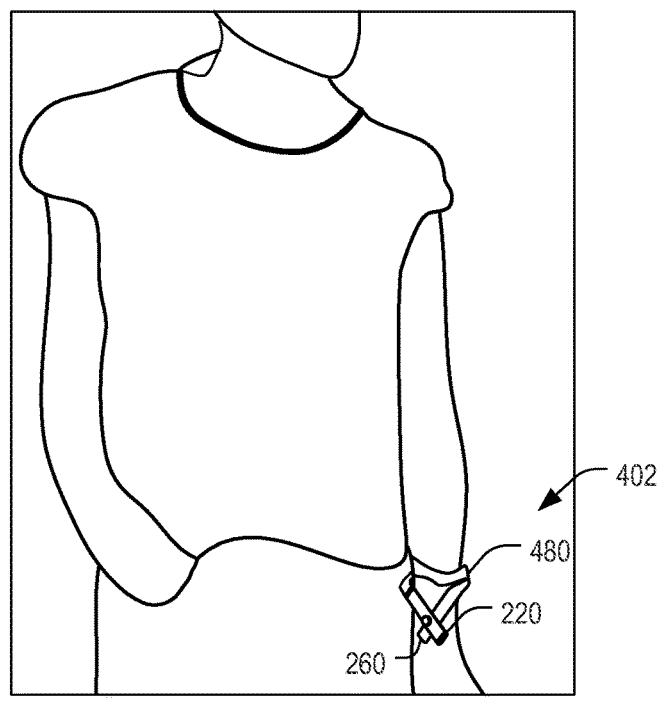
FIG. 4 is a diagram of illustrative embodiments of a modular fashion accessory having bracelet configurations.
Figure 4:
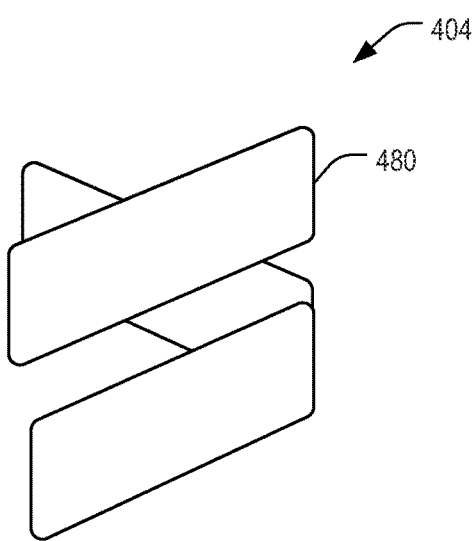

Referring to FIG. 4, an embodiment of the modular fashion accessory is illustrated in a bracelet configuration. As illustrated in a first view 402, the fashion accessory includes a bracelet that is formed from the first electronic component 220 being coupled to the second electronic component 260 via a connecting element 480. The connecting element 480 may be dimensioned to provide one or more wraps around the wearer's wrist and enabling the first electronic component 220 to be attached to the second electronic component 260 proximate to a wrist of the wearer. In some implementations, the connecting element 480 may be the connecting element 280 of FIG. 2, such as when the wearer elects to wear the wearable item as a bracelet rather than a necklace. In other implementations, the connecting element 480 may be specifically dimensioned to enable wear at the wrist and may be distinct from the connecting element 280 of the necklace configuration shown in FIG. 2.

A second view 404 illustrates another embodiment of the connecting element 480 wrapped multiple times around the wrist of the user. The connecting element 480 shown in the second view 404 has a larger width and a longer length than shown in the first view 402 to enable three wraps around a wrist of the user as compared to the shorter length and the smaller width as shown in the first view 402. Although FIG. 4 illustrates a two-wrap bracelet configuration and a three-wrap bracelet configuration, in other implementations a single-wrap bracelet configuration may be used, or a configuration may include more than three wraps when the connecting element 480 is dimensioned to wrap more than three times around the wrist of the wearer.

Figure 5:
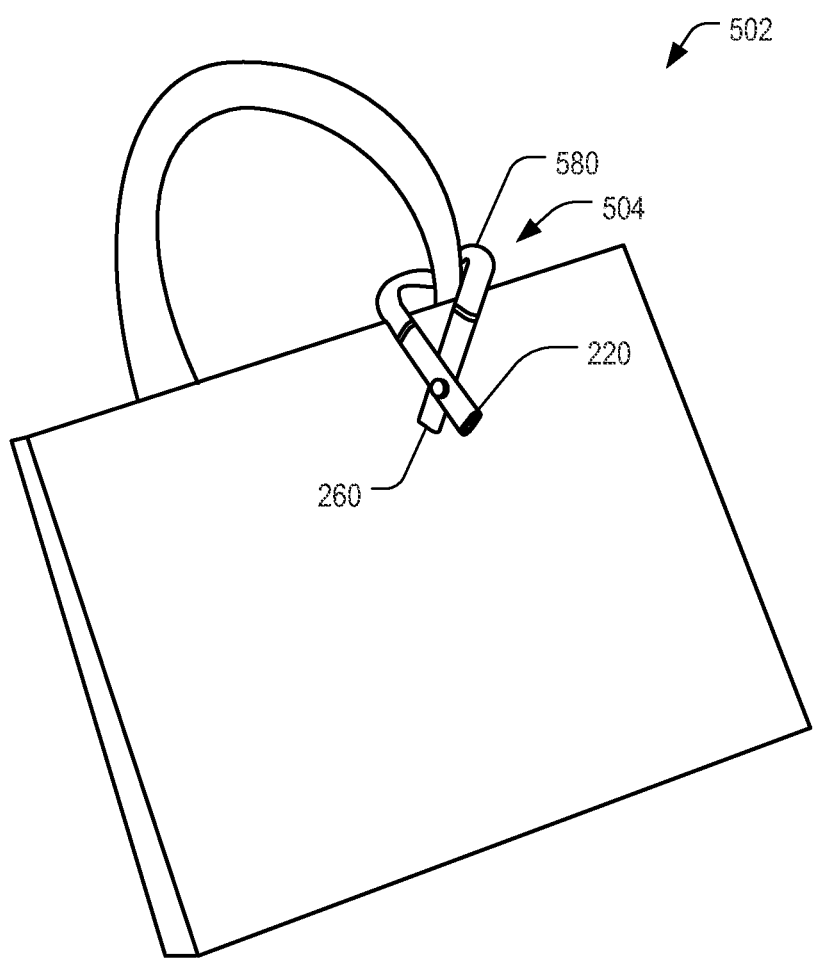
FIG. 5 is a diagram of another particular illustrative embodiment of a modular fashion accessory having a key-chain-style purse accessory configuration.

FIG. 5 illustrates an implementation 502 where the modular fashion accessory includes a keychain-style purse accessory 504. The keychain-style purse accessory 504 includes the first electronic component 220 and the second electronic component 260 coupled to a connecting element 580. The connecting element 580 may correspond to a shortened version of the connecting element 280 of FIG. 2 having a length dimensioned to enable the keychain-style purse accessory 504 to be fastened around a handle of a handbag or purse as illustrated in FIG. 5.

Figure 6:
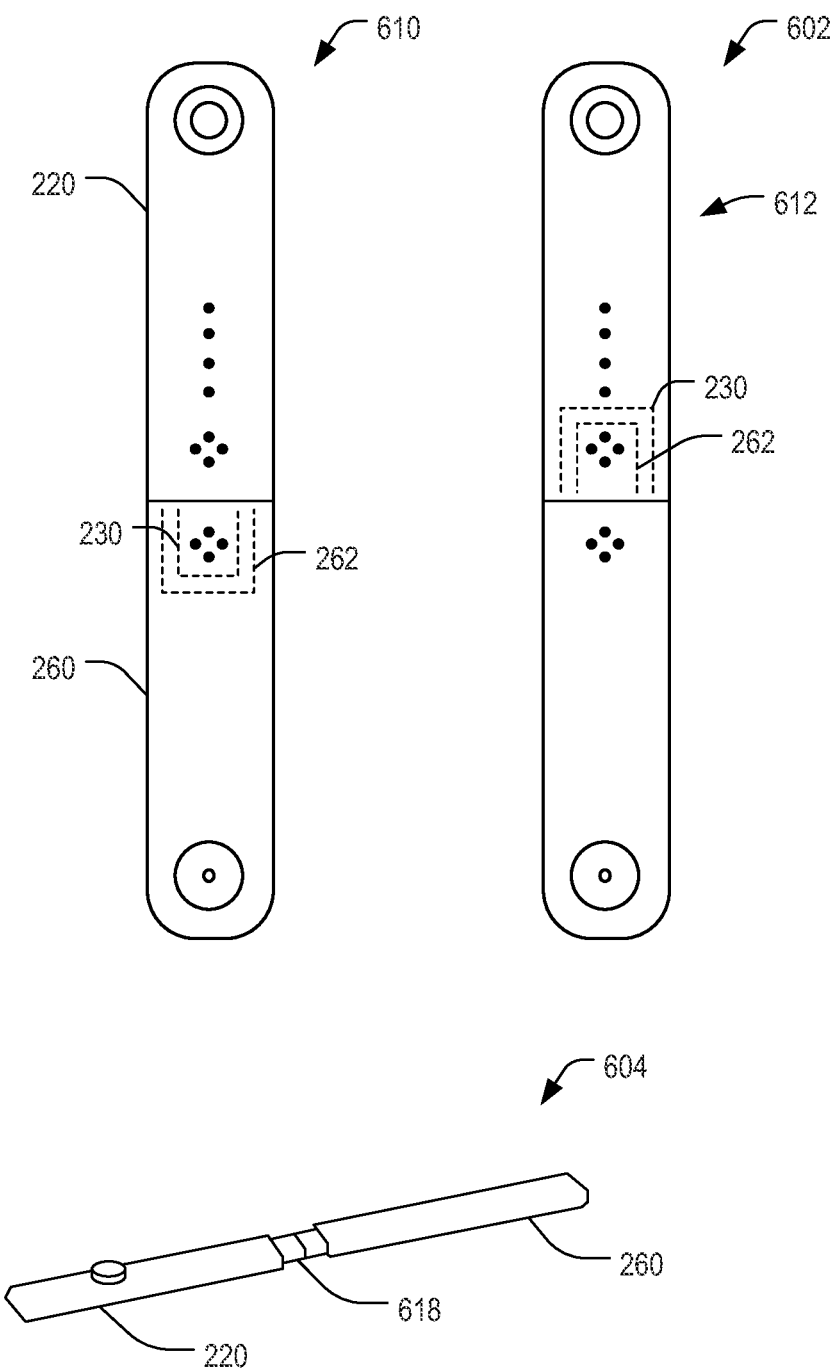
FIG. 6 is a diagram of illustrative embodiments of a modular fashion accessory having stick-type configurations.

FIG. 6 illustrates a first view 602 and a second view 604 of the modular fashion accessory formed into a stick configuration. The first view 602 illustrates two embodiments of the first electronic component 220 directly coupled to corresponding embodiments of the second electronic component 260. For example, the first connector 230 of the first electronic component 220 may be a male-type connector and the second connector 262 of the second electronic component 260 may be a female-type connector that may be configured to be connected to the first connector 230.

In a first embodiment 610, the first connector 230 is illustrated as being a male-type connector. In a second embodiment 612, the first connector 230 is illustrated as being a female-type connector that is connected to the second connector 262, and the second connector 262 has a male-type configuration.

In the second view 604, the modular fashion accessory having the stick configuration includes an adapter 618 configured to enable connection between the first electronic component 220 and the second electronic component 260. The adapter 618 may be a male-to-male adapter and/or a female-to-female adapter, as illustrative non-limiting examples.

Figure 7:
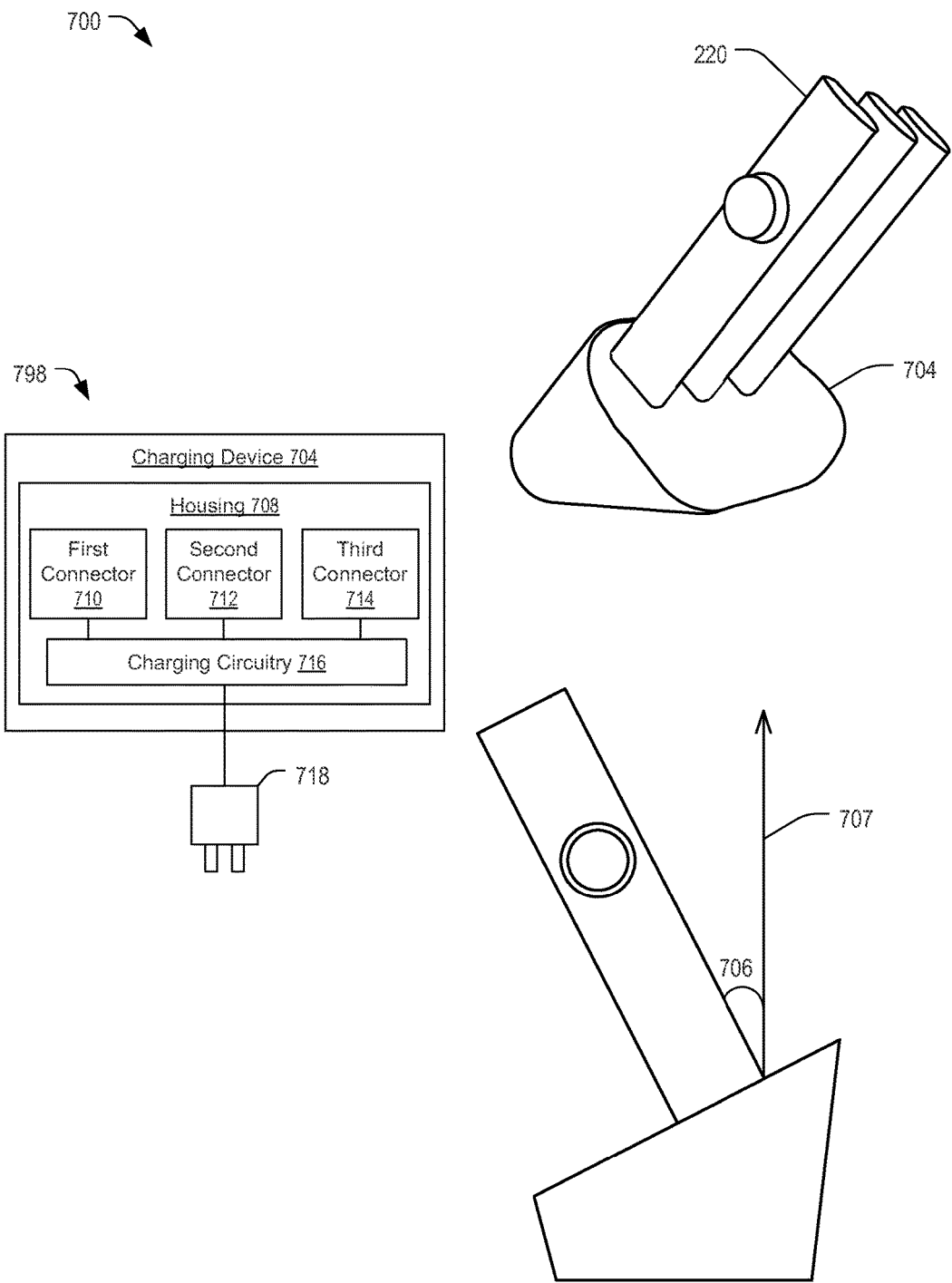
FIG. 7 is a diagram of a particular illustrative embodiment of a charging device that can be used with a modular fashion accessory.

Referring to FIG. 7, a particular implementation including one or more modules of the modular fashion accessory coupled to a charging device 704 is depicted and generally designated 700. The charging device 704 may be configured to charge one or more batteries of one or more energy storage modules (e.g., the battery modules 108, 110 of FIG. 1) concurrently with providing energy to the first electronic component 220 (e.g., the camera module 106 of FIG. 1) while the respective modules are plugged into, or connected to, connectors of the charging device 704. For example, the charging device 704 may include three connectors, enabling the charging device 704 to be connected to each of the modules concurrently. For example, the charging device 704 may correspond to the charger 104 of FIG. 1 that is coupled to the camera module 106, to the first battery module 108, and to the second battery module 110 of FIG. 1. As indicated with respect to FIG. 2, the camera module 106 may correspond to the first electronic component 220 of FIG. 2, and each of the battery modules 108, 110 of FIG. 1 may correspond to instances of the second electronic component 260 of FIG. 2. A block diagram 798 illustrates components of the charging device 704 according to a particular implementation. The charging device 704 is illustrated as including a first connector 710, a second connector 712, and a third connector 714. The connectors 710-714 are coupled to charging circuitry 716. The charging circuitry 716 is coupled to an alternating-current (AC) plug 718. A housing 708, such as a decorative housing, may enclose the charging circuitry 716 and may at least partially enclose the connectors 710-714. For example, one or more of the connectors 710-714 may be interior of the housing 708 and may be accessible via one or more openings through the housing 708 to enable insertion of the connectors of the modules for charging.

The first connector 710 may be configured to provide power to the first electronic component 220 while the first electronic component 220 is coupled to the first connector 710. The first connector 710 may be configured to provide sufficient power to the first electronic component 220 to enable operation of the camera 222. The second connector 712 is coupled to the charging circuitry 716 and may be configured to provide power to the second electronic component 260 while the second electronic component 260 is coupled to the second connector 712. The second electronic component 260 may include the one or more rechargeable energy storage devices, such as the battery 264 and/or the battery 266 of FIG. 2.

As illustrated in FIG. 7, the first connector 710 may be configured to hold the first electronic component 220 at an angle 706 relative to vertical 707. The angle 706 of the first electronic component 220 relative to vertical 707 may substantially match an angular orientation of the camera 222. For example, as described with respect to FIG. 2, a sensor of the camera 222 may have an angular orientation (e.g., the angle 296) to compensate for an angle of the camera 222 when being worn in the necklace configuration illustrated in FIG. 2. Thus, the charging device 704 may hold the camera 222 at substantially the same angle as when the camera 222 is being worn in the necklace configuration or in one of the other configurations illustrated with respect to FIGS. 2-5.

The charging circuitry 716 may be configured to provide power to the first electronic component 220 concurrently with providing power to the second electronic component 260 to enable operation of the camera 222 while the rechargeable battery of the second electronic component 260 is being charged. In such a configuration, the charging device 704 may enable operation of the camera 222 in a "nanny-cam" mode in which the camera 222 may be operated remotely, such as via instructions received from the remote device 144 described with respect to FIG. 1 to provide remote monitoring of the items within a field of view and/or within range of a microphone of the first electronic component 220 while the first electronic component is connected to the charging device 704.

Figure 8:
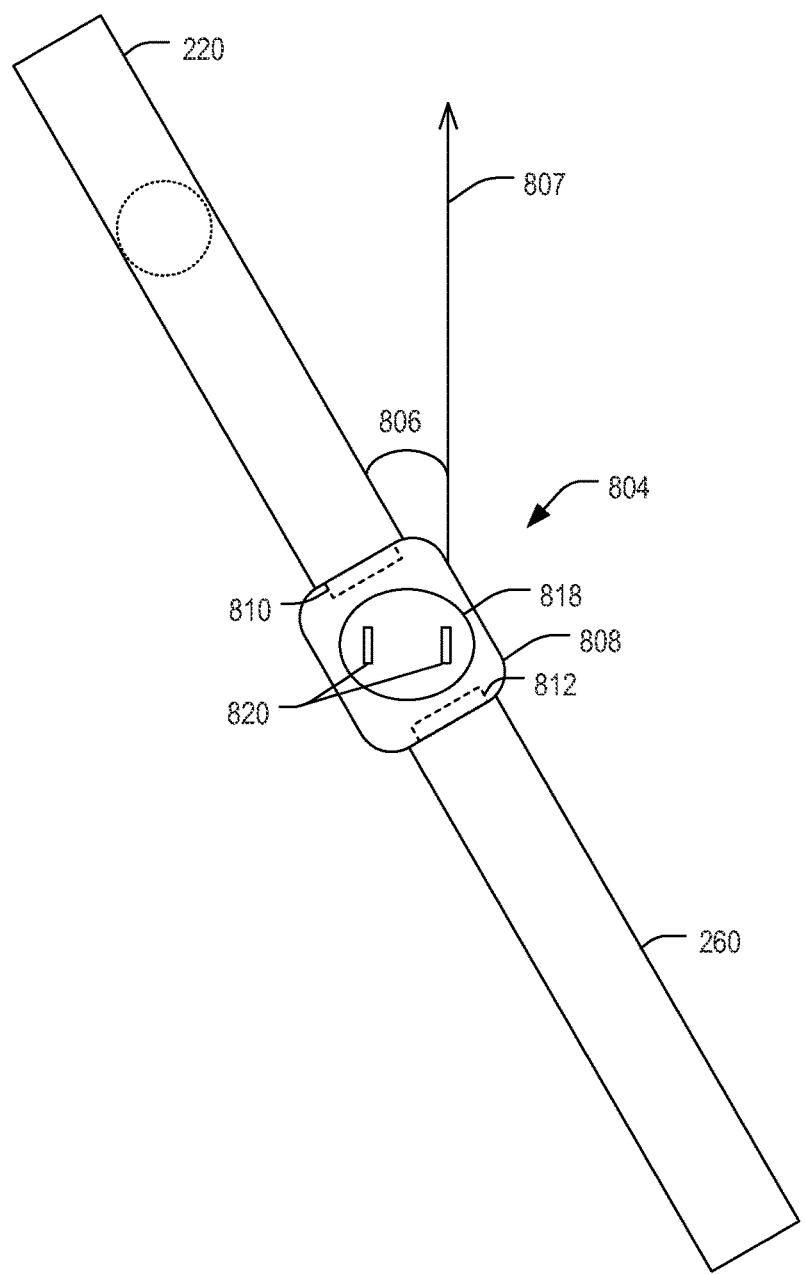
FIG. 8 is a diagram of a particular illustrative embodiment of a charging device associated with a modular fashion accessory with a camera device.

Referring to FIG. 8, a particular embodiment of a charging device is depicted and generally designated 804. The charging device 804 includes a housing 808 that includes or at least partially includes a first connector 810, (e.g., corresponding to the first connector 710 of FIG. 7), and a second connector 812, (e.g. corresponding to the second connector 712 of FIG. 7). An AC plug 818 is illustrated as including prongs 820 extending outward (i.e., in a direction out of the page). FIG. 8 also illustrates the first electronic device 220 connected to the first connector 810 and the second electronic device 260 connected to the second connector 812.

As compared to the charging device 704 of FIG. 7, which may be positioned on a flat surface such as a table, a desk, or a counter, the charging device 804 illustrated in FIG. 8 may be plugged directly into and may be supported by an electrical outlet or socket. As illustrated, the housing 808 is a single housing that encloses, at least partially, the first connector 810, the second connector 812, and the AC plug 818. Although only two connectors 810, 812 are shown, in other embodiments the charging device 804 may include more than two connectors. The AC plug 818 may be oriented at an angle 806 relative to vertical 807 such that the first electronic component 220 is held by the first connector 810 at the angle 806 while the charging device 804 is plugged into a wall electrical outlet or socket. The angle 806 may correspond to the angle 706 described with reference to FIG. 7 and may at least partially compensate for an angular orientation offset of the camera 222. For example, the angle 806 may substantially match the angle 296 of FIG. 2.

Figure 9:
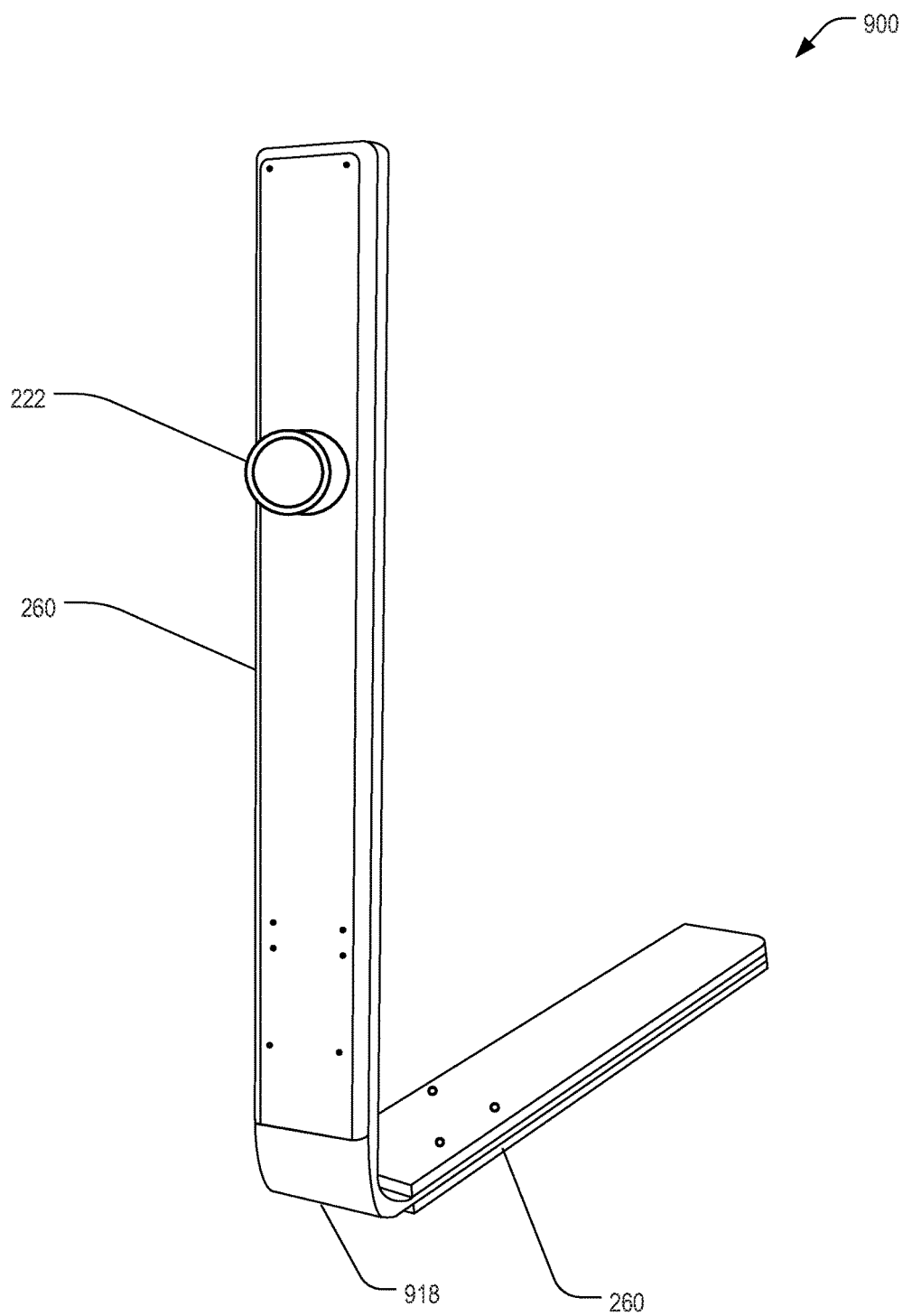
FIG. 9 is a diagram of another particular illustrative embodiment a modular fashion accessory having an L-shaped configuration.

FIG. 9 illustrates an embodiment 900 of the modular components in an "L-shaped" configuration, such as the L-shaped configuration illustrated in the example 138 of FIG. 1. The first electronic component 220 including the camera 222 is coupled to the second electronic component 260 via an adapter 918. The adapter 918 may be similar to the adapter 618 described with reference to FIG. 6 and may include a bend to enable the first electronic component 220 to be held in an upright position while the second electronic component 260 is positioned on a substantially horizontal surface. In the L-shaped configuration depicted in FIG. 9, the camera 222 may be operated as a stationary camera device, and may be operated in the "nanny-cam" mode described with reference to FIG. 7.

Figure 10:
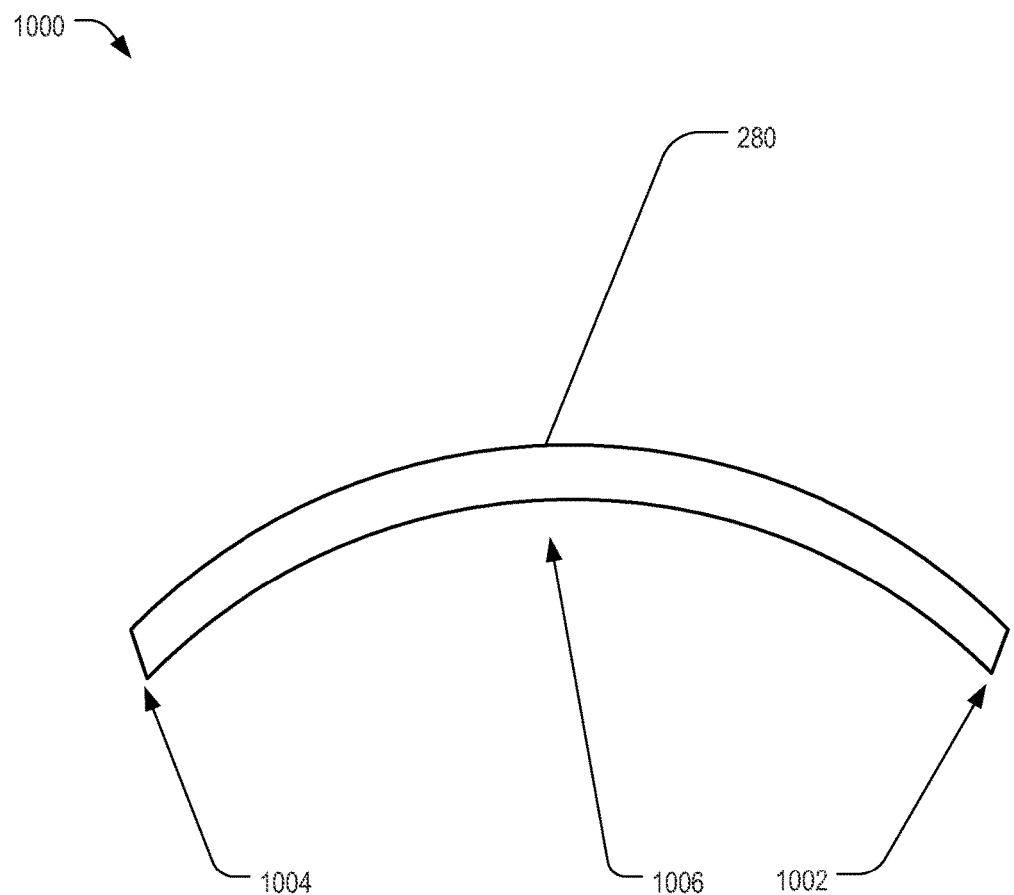
FIG. 10 is a diagram of another particular illustrative embodiment of a neck band component of a modular fashion accessory.

FIG. 10 illustrates an example of the connecting element 280 as a flexible band having a curve. For example, the cover 286 of FIG. 2 may include a curve between a first end 1002 (e.g., at the connector 282) and a second end 1006 (e.g., at the connector 284). The curve results in a center portion 1006 not being co-linear with the first end 1002 and the second end 1004 when the flexible band is laid flat, such as on a table top. The curve may be dimensioned to cause the first electronic component 220 of FIG. 2 to have a particular angle (e.g., 60 degrees) relative to the second electronic component 260 while the first electronic component 220 is coupled to the connector 282 and the second electronic component 260 is coupled to the second connector 284.

Figure 11:
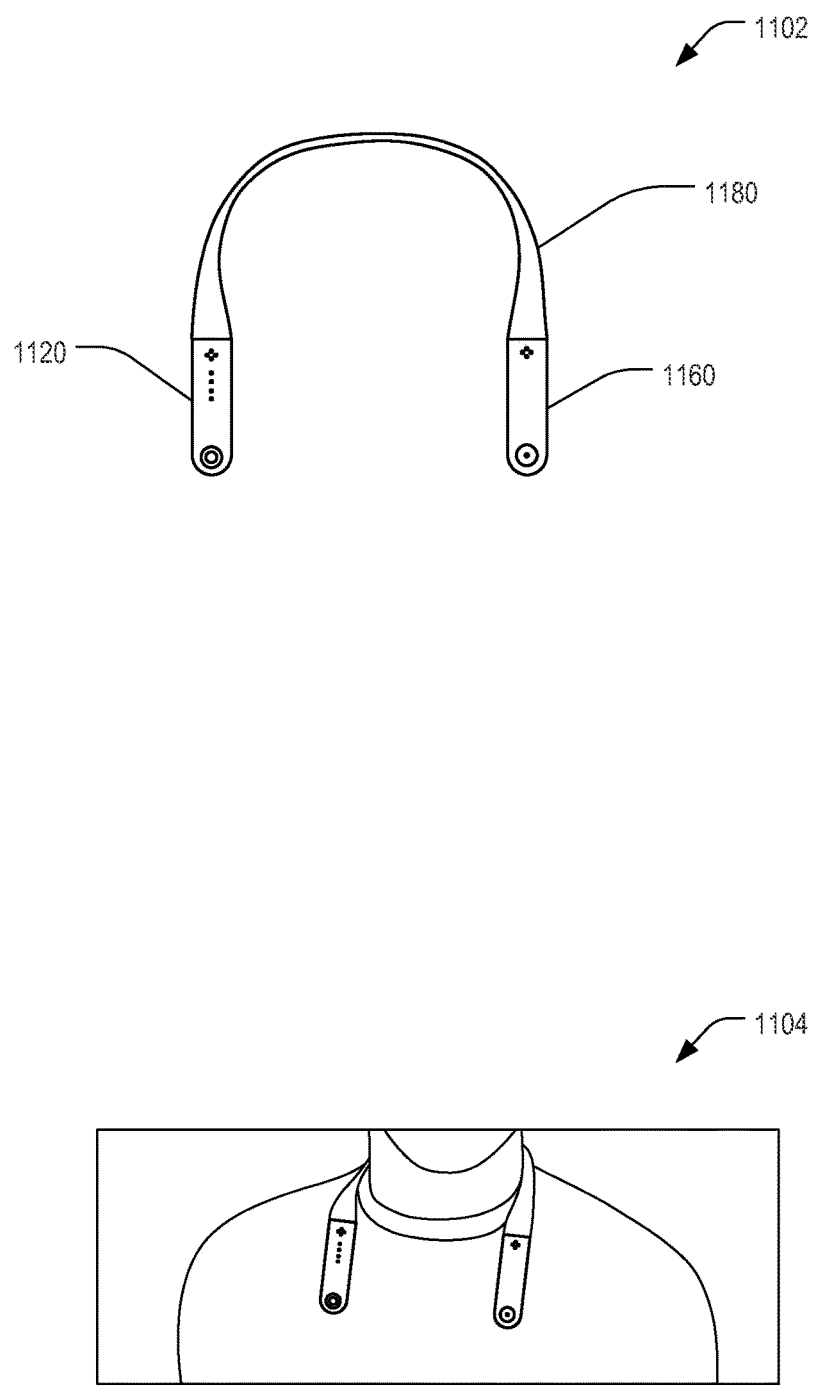
FIG. 11 is a diagram of another particular illustrative embodiment of a modular fashion accessory.

FIG. 11 illustrates a first view 1102 and a second view 1104 of a modular fashion accessory. A first electronic component 1120 is coupled to a second electronic component 1160 via a connecting element 1180. As illustrated, the first electronic component 1120 may correspond to the first electronic component 220 of FIG. 2, the second electronic component 1160 may correspond to the second electronic component 260 of FIG. 2, and the connecting element 1180 may correspond to the connecting element 280 of FIG. 2. The wearable connecting element 1180 may be configured to maintain the housing of the first electronic component 1120 substantially parallel to the housing of the second electronic component 1160 while being worn. The second view 1104 illustrates the wearable item formed by the connection of the first electronic element 1120, the second electronic element 1160, and the connecting element 1180 being worn as a necklace or as another neck-suspended fashion accessory. The connecting element 1180 may comprise a flexible band or may comprise a rigid or semi-rigid material.

Figure 12:
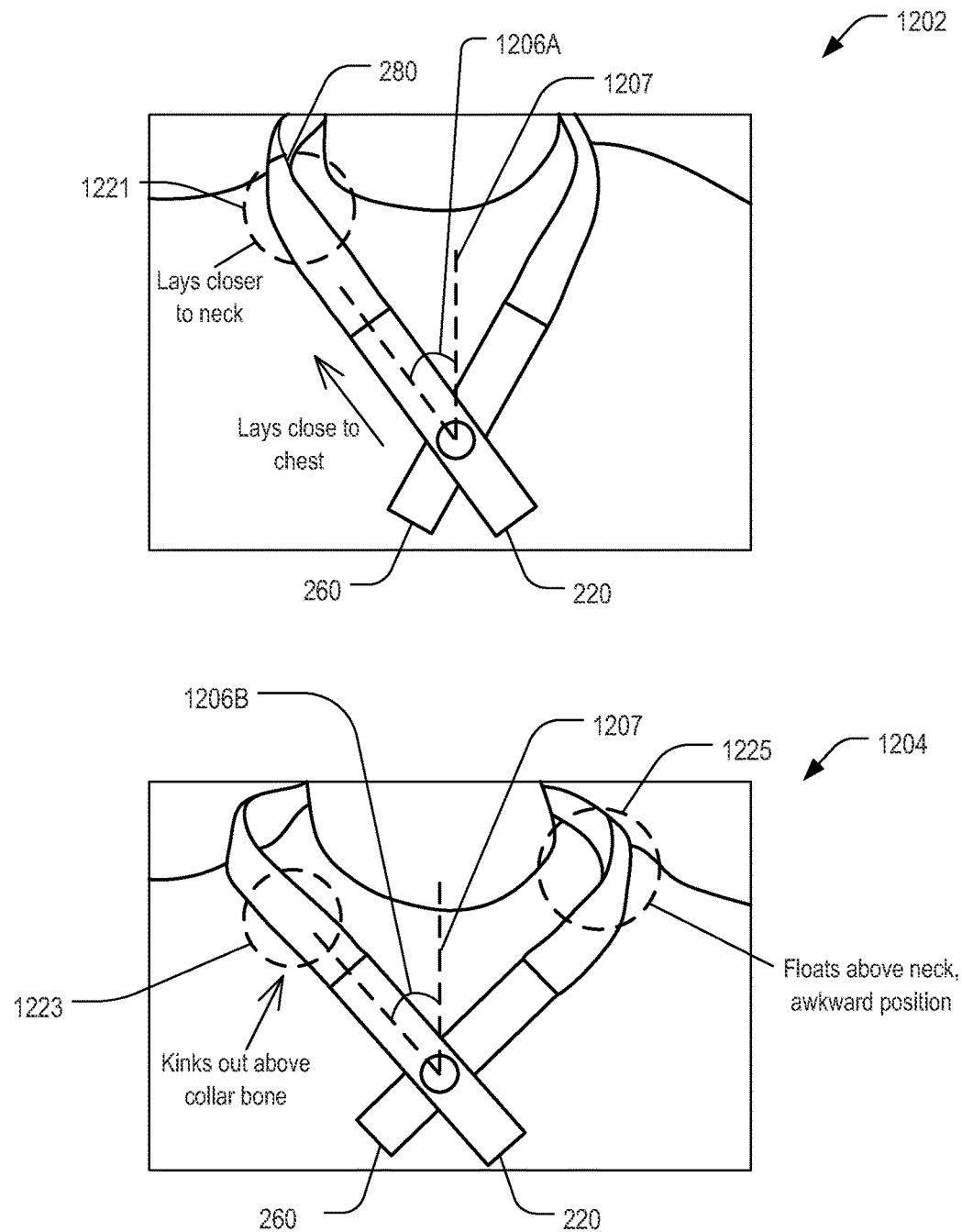
FIG. 12 is a diagram of illustrative embodiments of a modular fashion accessory having necklace configurations.

FIG. 12 illustrates a comparison of first configuration 1202 and a second configuration 1204 of a modular fashion accessory as a wearable item having a necklace configuration. In the first configuration 1202, the first electronic component 220 is coupled to the second electronic component 260 via the connecting element 280. An angle 1206A is formed between the housing of the first electronic component 220 and vertical 1207. The angle 1206A is substantially 30 degrees. The first electronic component 220 and the second electronic component 260, in addition to portions of the connecting element 280, lay relatively close to the wearer's chest. In addition, the connecting element 280 rests in relatively close proximity to the wearer's neck, illustrated at 1221. In the second configuration 1204, the angle between the housing of the first electronic component 220 and vertical 1207 is substantially 45 degrees, illustrated as angle 1206B. Because the angle 1206B is larger than the angle 1206A, the connecting element 280 may "kink" out around the wearer's collar bone, at 1223, and the connecting element 280 may "float" in this position and may maintain an awkward pose at a further distance from the user's neck, at 1225, as compared to the first configuration 1202, at 1221.

A more stylish appearance and a more comfortable wearer experience may result from having the angle between the first electronic component 220 and vertical 1207 being less than 45 degrees. In some implementations, the angle 1206A of substantially 30 degrees from vertical (resulting in a combined angle of substantially 60 degrees between the components 220, 260 when each of the components 220, 260 is offset by 30 degrees from vertical and attached to each other, such as illustrated in FIG. 2) provides enhanced user experience and/or an enhanced stylish appearance as compared to larger angles.

Figure 13:
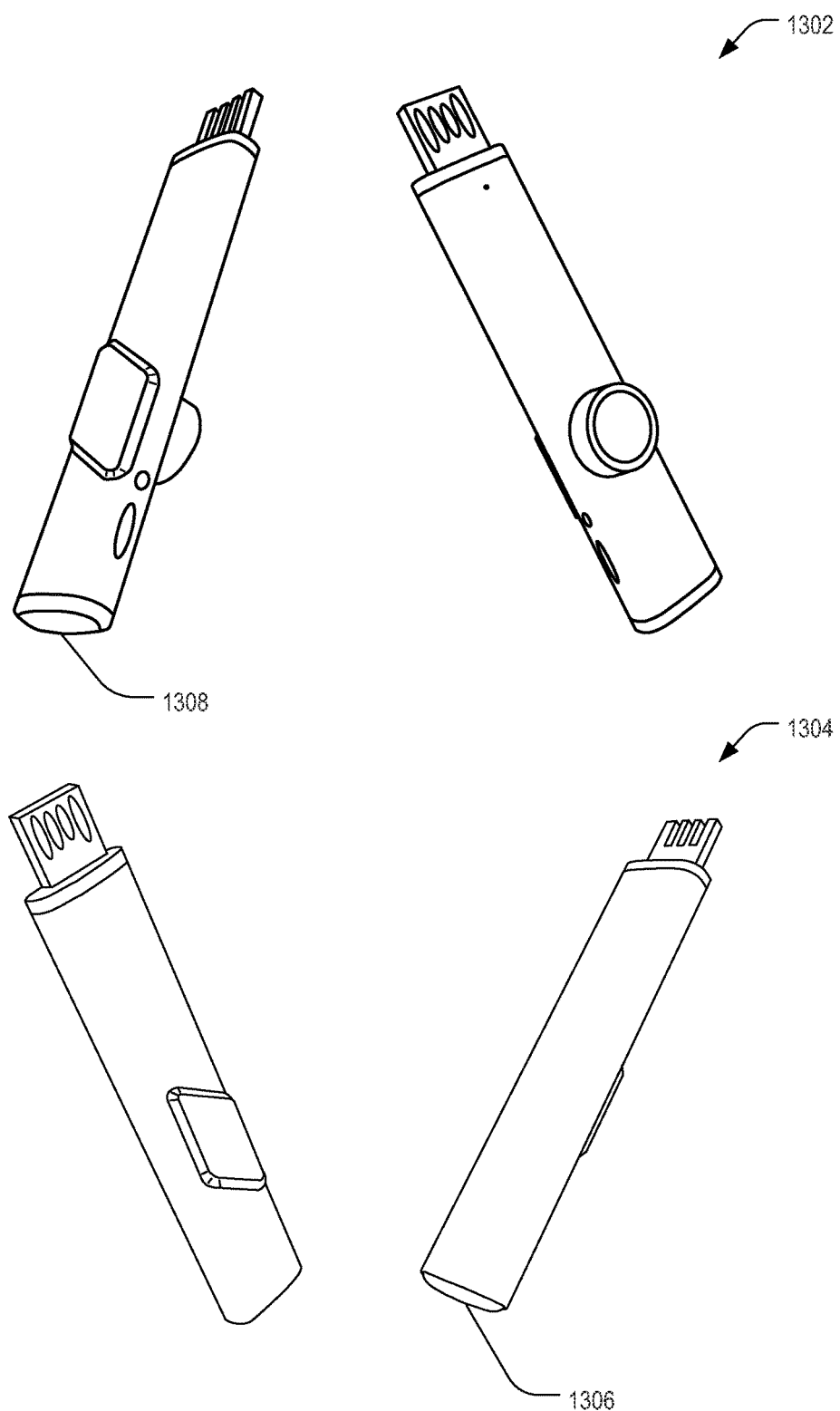
FIG. 13 is a diagram of another particular illustrative embodiment of components of the modular fashion accessory of FIG. 2.

FIG. 13 illustrates decorative and stylish aspects of an exemplary embodiment of the first electronic component 220 in a first view 1302 and decorative and stylish aspects of an embodiment of the second electronic component 260 in the second view 1304. In the first view 1302, an exterior surface of the first electronic component 220 comprises a reflective material, such as a metallic surface. The metallic surface may have a silver-type appearance or a gold-type appearance. In the second view 1304, the second electronic component 260 may have a polished metallic surface and/or a dark-colored exterior, such as a polished black housing. An end element 1306 may have a reflective and/or polished metallic appearance that may substantially match the appearance of an end element 1308 of the first electronic component 220.

Figure 14:
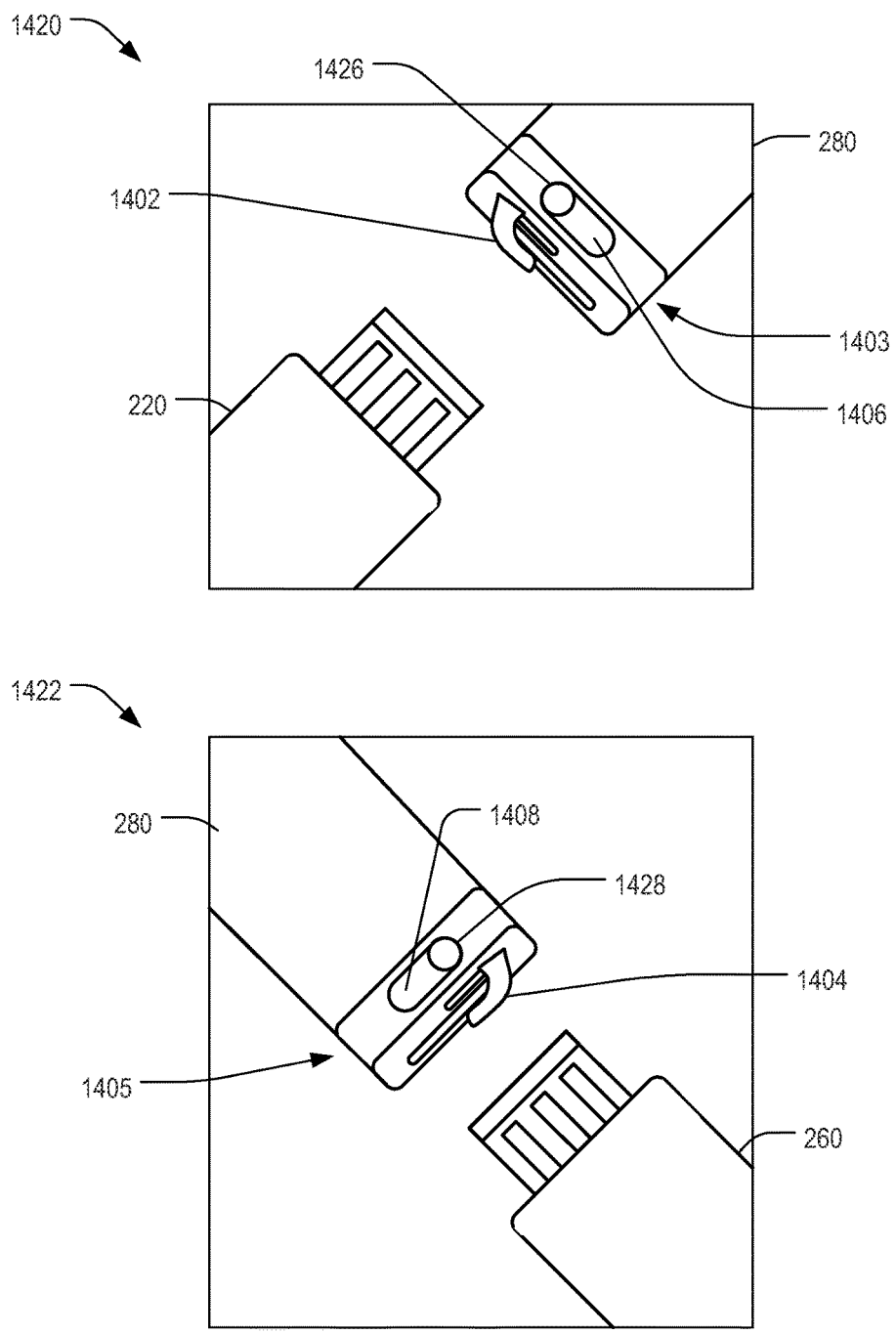
FIG. 14 is a diagram of a particular illustrative embodiment of connectors of components of the modular fashion accessory of FIG. 2.

FIG. 14 illustrates a latching mechanism that may be implemented so that the connecting element 280 may be latched to the first electronic component 220 and to the second electronic component 260. A first view 1420 illustrates a first latching element 1402 at a first end 1403 of the connecting element 280. The first latching element 1402 is configured to engage a first receptacle (not shown) of the first electronic component 220 to retain (e.g., to latch onto and hold in place) the first electronic component 220. The second view 1422 illustrates a second latching element 1404 at a second end 1405 that is opposite the first end 1403 of the connecting element 280. The second latching element 1404 is configured to engage a second receptacle (not shown) of the second electronic component 260 to retain the second electronic component 260. The latching elements 1402, 1404 may enable a secure fastening or attachment of modular components to the connecting element 280 by latching onto attached components and holding the components in place.

The first latching element 1402 is illustrated as including a color coded indicator 1406 that may visually distinguish a latched state of the first latching element 1402 from an unlatched state of the first latching element 1402. Similarly, the second latching element 1404 may include a color coded indicator 1408 to visually distinguish between a latched state and a non-latched state of the second latching element 1404. The first latching element 1402 may be configured to automatically engage the first receptacle of the first electronic component 220 when the first electronic component 220 is coupled to the connecting element 280. The first latching element 1402 may further be configured to be manually disengaged from the first receptacle to remove the first electronic component 220 from the connecting element 280. For example, a spring biased sliding mechanism 1424 may enable an automatic engagement via a spring biasing and a manual disengagement via actuation of the mechanism 1426 to enable disengagement of the latch from the recess. A sliding mechanism 1428 may also be provided with or as part of the second latching element 1404 and may operate in a substantially similar manner as the sliding mechanism 1426.

Figure 15:
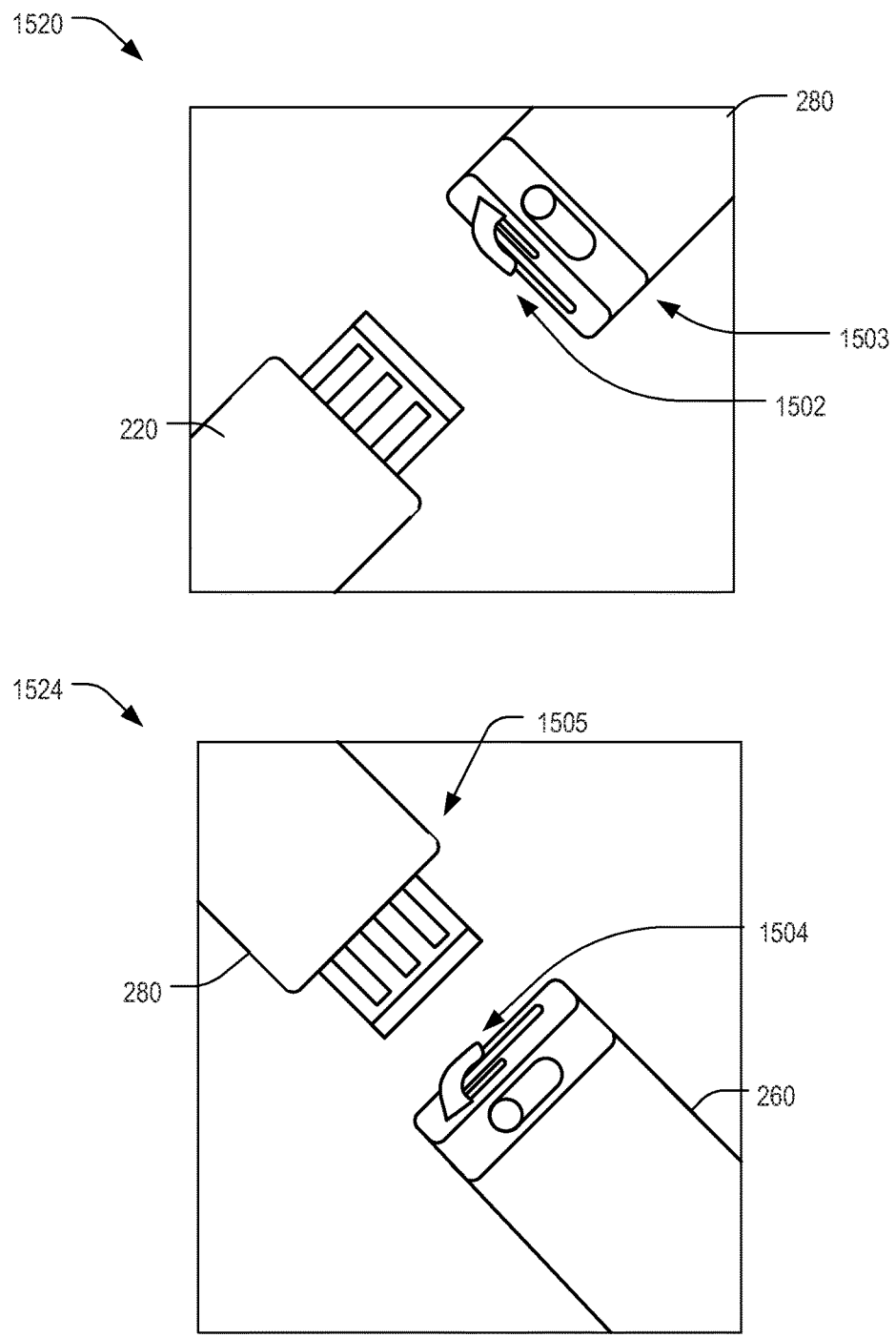
FIG. 15 is a diagram of another particular illustrative embodiment of connectors of components of the modular fashion accessory of FIG. 2.

FIG. 15 depicts another example of latching elements in which the connecting element 280 includes a latching element 1502 at a first end 1503 and does not include a latching element at the second end 1505 that is opposite the first end 1503. A first view 1520 depicting the first end 1503 corresponds to the first view 1420 of FIG. 14. A second view 1524 depicting the second end 1505 illustrates that a male-type connector is attached to or is included in the second end 1505 that is connectable to a female-type connector in the second electronic component 260. The second electronic component 260 includes a latching mechanism 1504 (Not shown). The latching mechanism 1504 may be configured to engage a recess in the second end 1505 of the connecting element 280. The latching mechanism 1504 may operate in a substantially similar manner as described with respect to the latching mechanism 1404 of FIG. 14.

Figure 16:
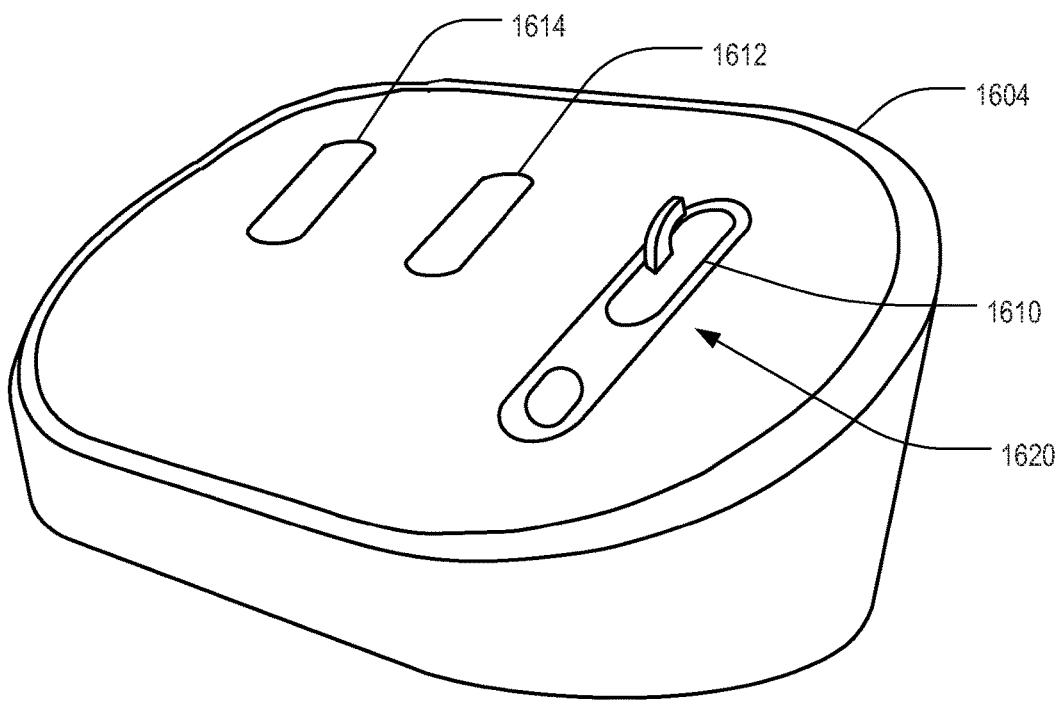
FIG. 16 is a diagram of another particular illustrative embodiment of a charging device associated with a modular fashion accessory.

FIG. 16 depicts an example of a charging device 1604. In a particular embodiment, the charging device 1604 may correspond to the charging device 704 of FIG. 7. The charging device 1604 is illustrated as including a first recess for a first connector 1610, a second recess for a second connector 1612, and a third recess for a third connector 1614. The charging device 1604 includes a latching element 1620. The latching element 1620 may include a mechanism configured to engage a first receptacle of the first electronic component 220 of FIG. 2 to retain the first electronic component 220 when the first electronic component 220 is connected to the first connector 1610 of the charging device 1604. The latching element 1620 may include a color coded indicator and a spring biased release mechanism to enable automatic latching upon insertion of the first electronic component 220 and to enable manual release of the first electronic component 220 upon actuation of the spring bias sliding mechanism, such as described with respect to the latching mechanism 1402 of FIG. 14.

Figure 17:
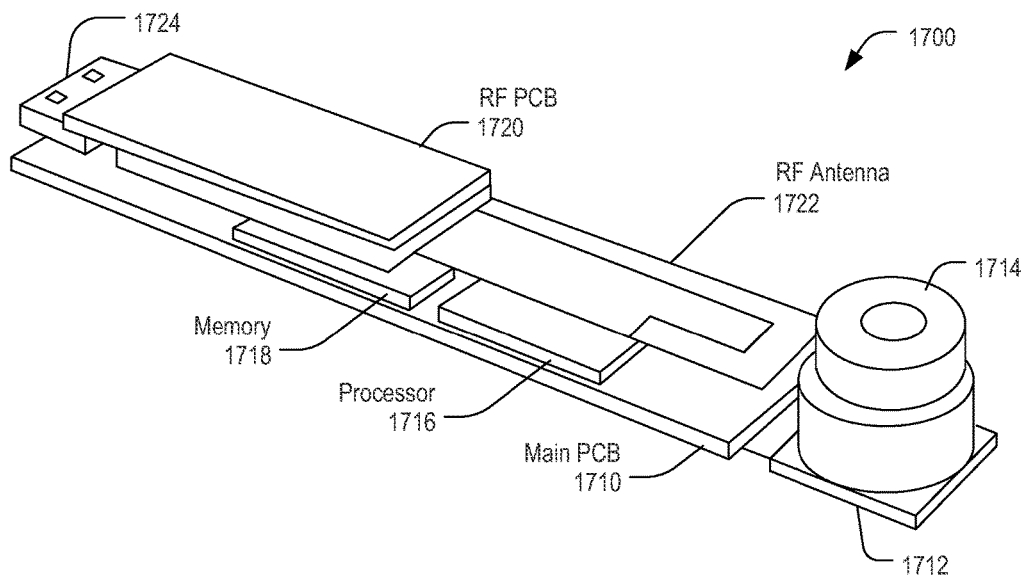
FIG. 17 is a diagram of a first particular illustrative embodiment of a circuit board of an electronic component of a modular fashion accessory.
Figure 17:
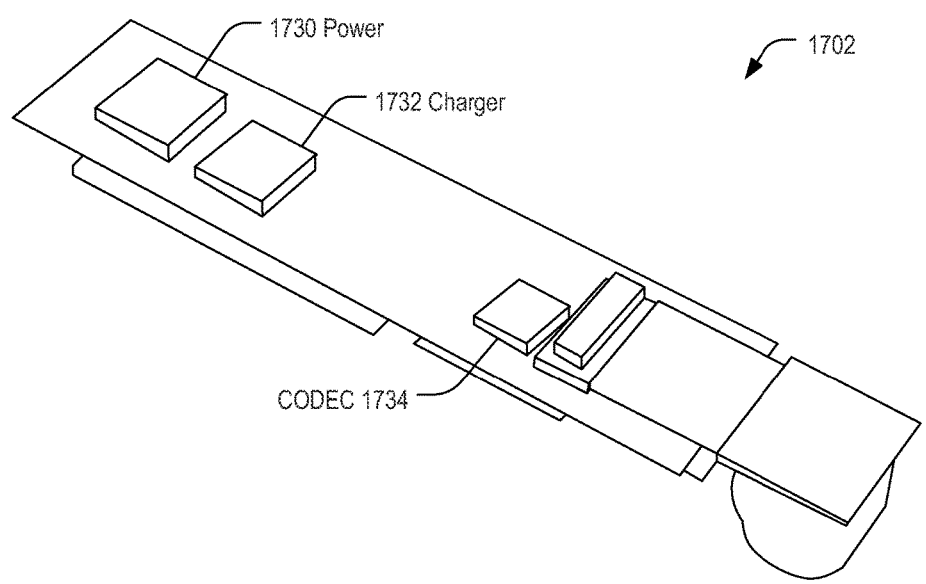

Referring to FIG. 17, a first view 1700 and a second view 1702 depict an illustrative example of components that may be included in the first electronic component 220 of FIG. 2. A main printed circuit board (PCB) 1710 may be coupled to a camera 1712, such as the camera 222 of FIG. 2. A lens module 1714 may be attached to the camera 1712. A processor 1716 is coupled to the main PCB 1710. For example, the processor 1716 may be included in the controller 226 of FIG. 2. A memory 1718 is coupled to the main PCB 1710. The memory 1718 may correspond to the memory 232 of FIG. 2. A radio frequency (RF) (e.g., Wi-Fi) PCB 1720 is coupled to the main PCB 1710. The RF PCB 1720 may include circuitry to enable transmission and reception of wireless communications. The RF PCB 1720 may be coupled to an RF antenna 1722. The RF antenna 1722 may correspond to the antenna 229 of FIG. 2. The main PCB 1710 is further coupled to a connector 1724. For example, the connector 1724 may correspond to the first connector 230 of FIG. 2. Battery and power management circuitry may be included in a first power chip 1730 and a second power chip 1732 that are coupled to the main PCB 1710. For example, the first power chip 1730 and the second power chip 1732 may include circuitry that corresponds to the battery and power management module 240 of FIG. 2. A coder-decoder (CODEC) 1734 is coupled to the main PCB 1710. The CODEC 1734 may include circuitry configured to enable coding and decoding of data, such as circuitry that may be included in the controller 226 and/or the wireless interface 228 of FIG. 2.

Figure 18:
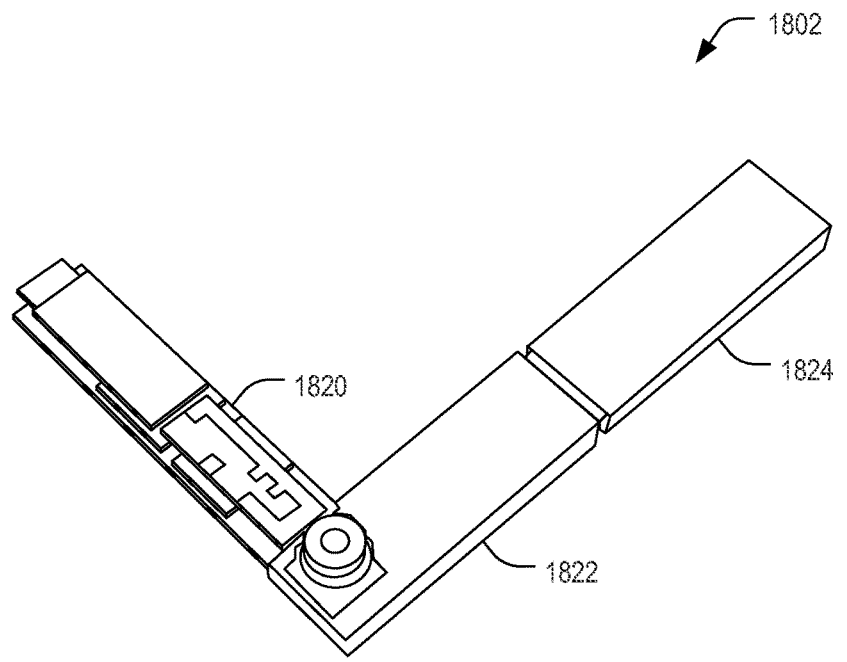
FIG. 18 is a diagram of a second particular illustrative embodiment of a circuit board of two electronic components of a modular fashion accessory.
Figure 18:
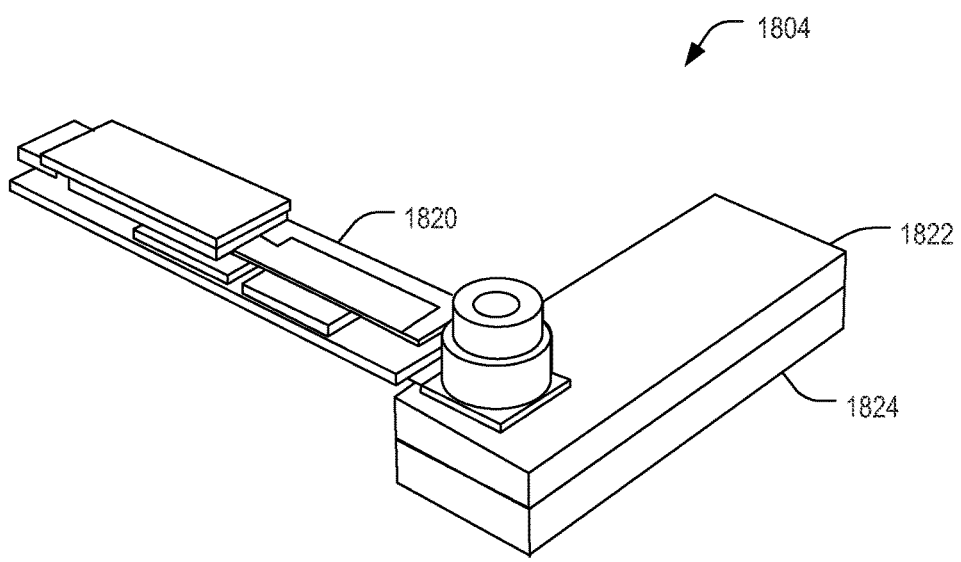

FIG. 18 depicts a first embodiment 1802 and a second embodiment 1824 of components that may be included in the first electronic component 220 and the second electronic component 260 of the modular fashion accessory illustrated in FIG. 2. First components 1820 may include a camera module, one or more PCB boards, a radio frequency antenna, and a connector, such as described with respect to FIG. 17. For example, the first components 1820 may correspond to components of the first electronic component 220 of FIG. 2. The first components 1820 are illustrated as overlapping with an arrangement of a first battery 1822 and a second battery 1824. For example, the first battery 1822 and the second battery 1824 may correspond to the battery 264 and the battery 266, respectively, of FIG. 2. In the first embodiment 1802, the first battery 1822 is arranged in an end-to-end configuration with the second battery 1824. In the second embodiment 1804, the first components 1820 overlap the first battery 1822 and the second battery 1824 in a stacked arrangement. In the first embodiment 1822, an overall length of the second electronic component 260 may be longer than in the second embodiment 1824 due to the combined lengths of the first battery 1822 and the second battery 1824, while a height (e.g., thickness) of the second electronic component 260 may be reduced in the first embodiment 1802 as compared to the second embodiment 1804.

Selection of the first embodiment 1802 or the second embodiment 1804 may be based at least partially on an acceptable outer dimension or "footprint" and/or shape of one or more of the electronic components of the modular fashion accessory. For example, stylish or aesthetically pleasing design considerations may be taken into account upon determining a selection of the first embodiment 1802, the second embodiment 1804, one or more other embodiments, or any combination thereof, to provide a stylish appearance and to enhance user satisfaction while wearing or using the modular fashion accessory.

Figure 19:
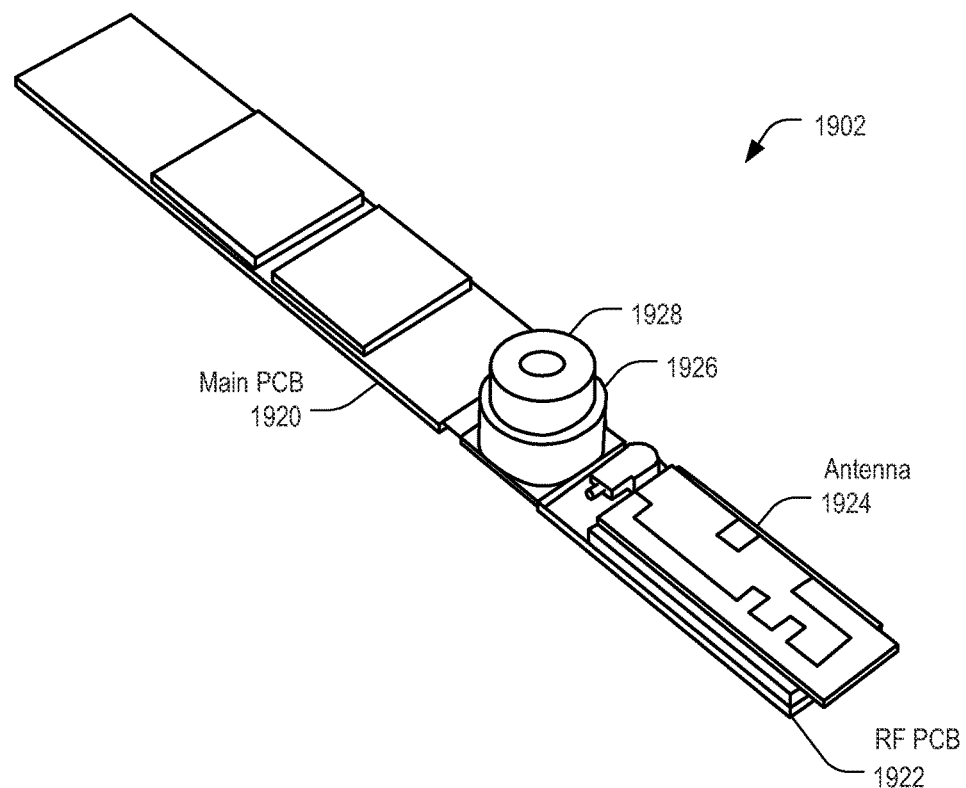
FIG. 19 is a diagram of a third particular illustrative embodiment of a circuit board of an electronic component of the modular fashion accessory.
Figure 19:
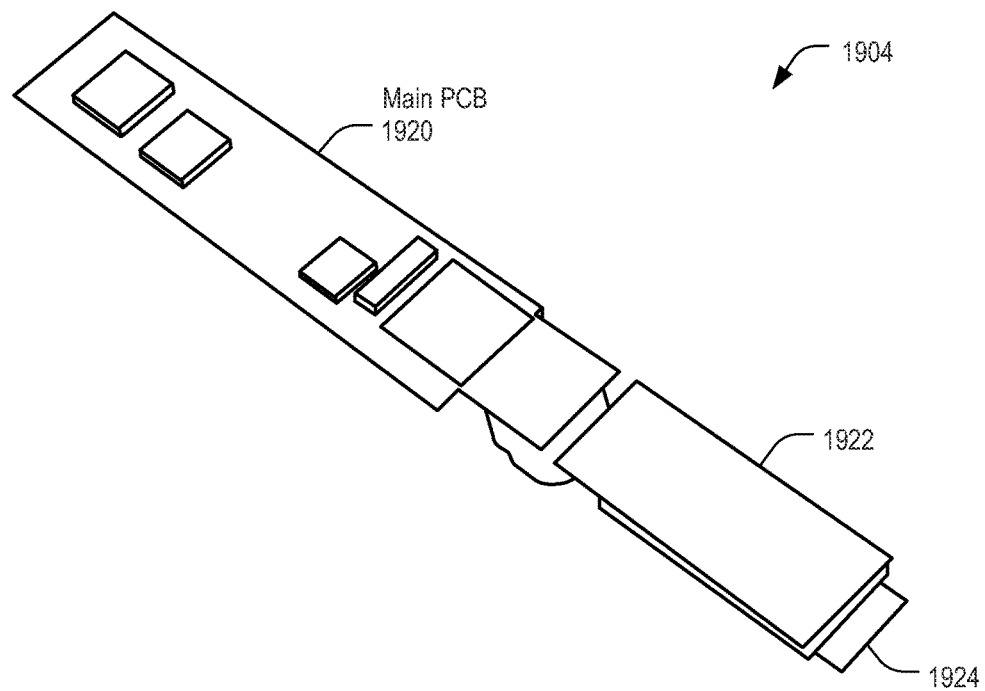

FIG. 19 depicts a first view 1902 and a second view 1904 of another embodiment of components that may be included in the one or more electronic components of the modular fashion accessory. As illustrated in FIG. 19, a main PCB 1920 may be coupled to a camera module 1926. A radio frequency PCB 1922 may also be coupled to the camera module 926. A lens module 928 may be coupled to the camera module 1926 and may be configured to extend outward from the main PCB 1920, such as in the lens housing 223 as illustrated in FIG. 2. As compared to the embodiment illustrated in FIG. 17, the camera module 1926 may be incorporated into a central section of the set of components as opposed to an end position of the set of components. The position of the camera module 1926 in the central portion may accommodate embodiments having similar features such as described with respect to the first view 202 and the second view 204 of the first electronic component 220 of FIG. 2. To illustrate, positioning of the camera 1926 toward a central portion of the set of components enables positioning of the camera at an intersection point when the first electronic component 220 overlaps the second electronic component 260 in a cross-type arrangement, such as illustrated with respect to the pendant 290 of the wearable item 201 of FIG. 2.

Figure 20:
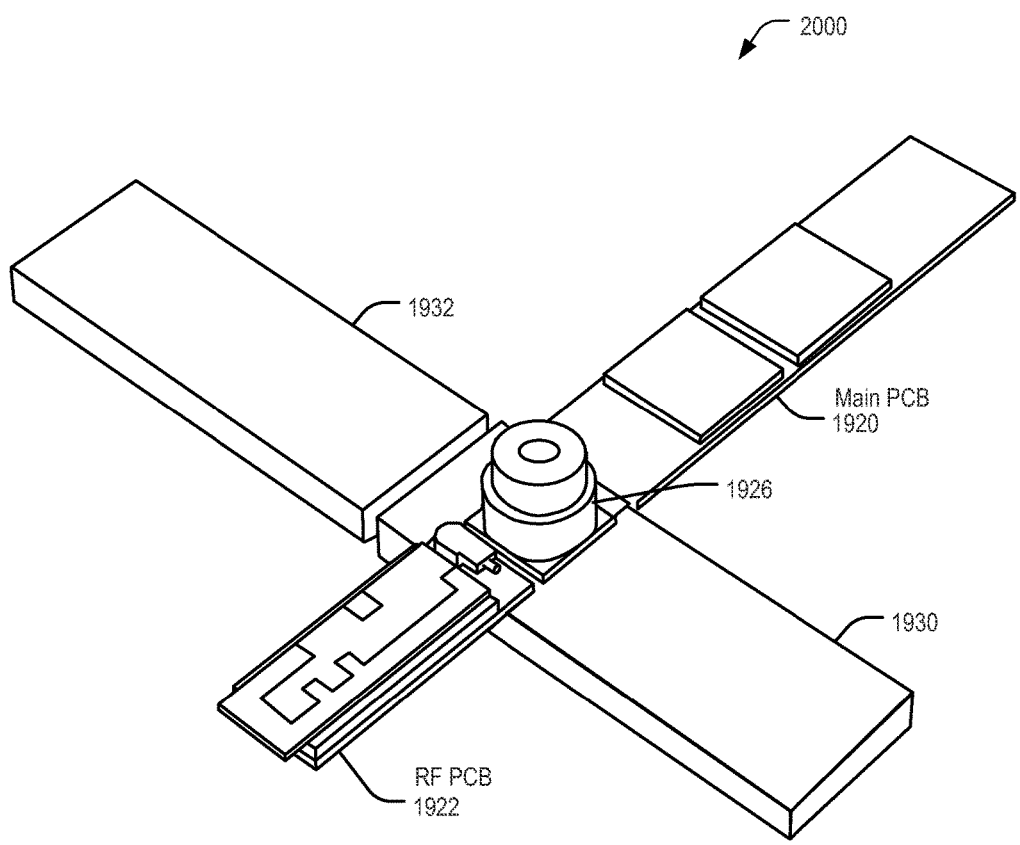
FIG. 20 is a diagram of a fourth particular illustrative embodiment of a circuit board of two electronic components of a modular fashion accessory.

FIG. 20 illustrates an arrangement 2000 of the set of components of FIG. 19 including the main PCB 1920, the camera module 1924, and the RF PCB 1922 in an overlapping arrangement with components of the second electronic component 260 of FIG. 2. A first battery 1930 and a second battery 1932 are illustrated in an end-to-end arrangement, such as depicted with respect to the first embodiment 1802 of FIG. 18. The end-to-end arrangement of the batteries 1930, 1932 is overlapped by the set of components illustrated in FIG. 19, with the camera module 1926 being substantially at the intersection (or overlap) between the set of components The main PCB 1920 is at one side of the battery 1930, and the RF PCB 1922 is at another side of the battery 1930. The position of the camera module 1924 substantially at the intersection between the components and the battery 1930 enables a cross-type shape having the camera at an intersection point, such as illustrated with respect to the wearable item 201 of FIG. 2.

Figure 21:
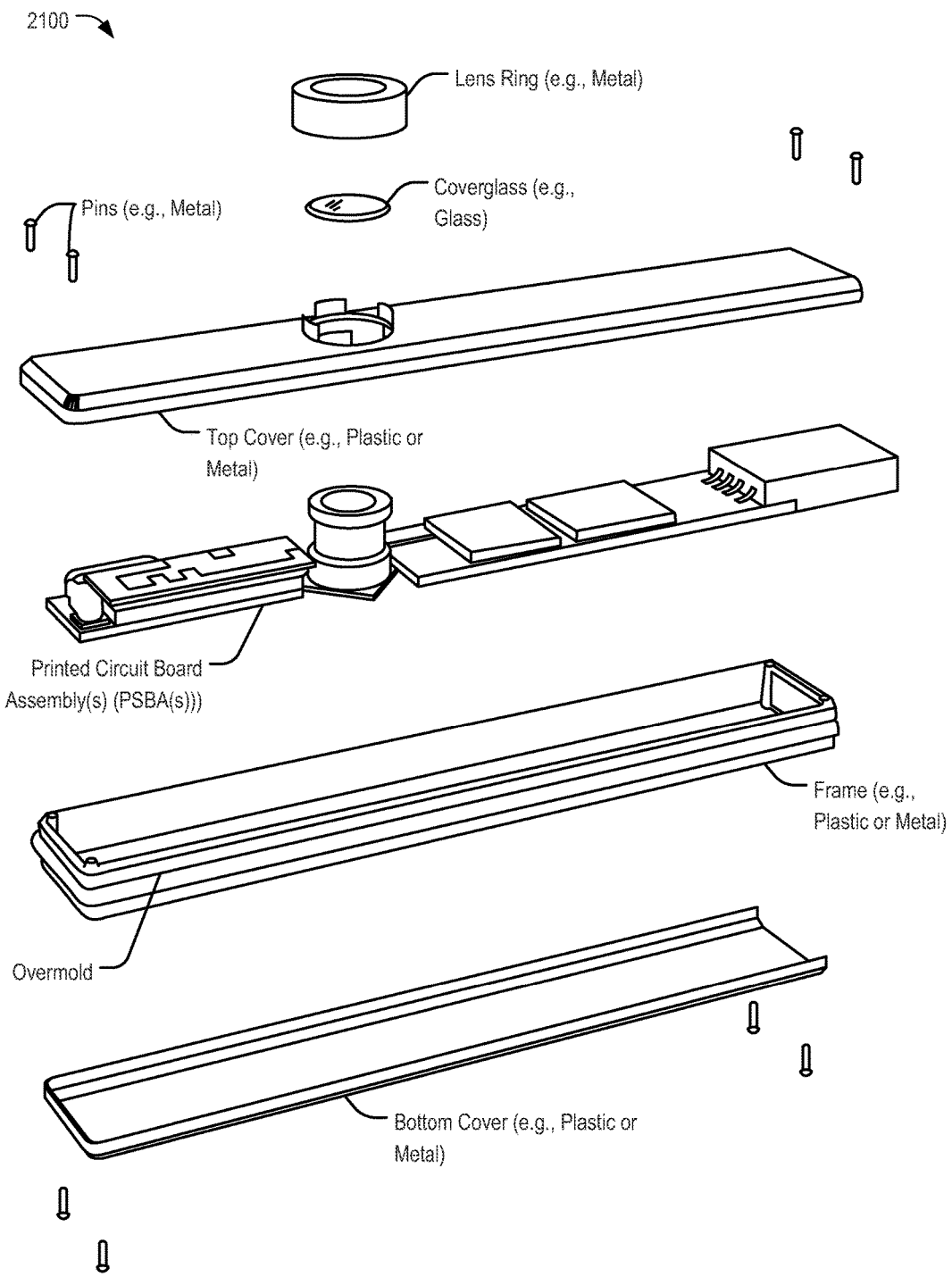
FIG. 21 is a diagram of an exploded view of a particular illustrative embodiment of an electronic component of a modular fashion accessory.

FIG. 21 depicts an example 2100 of an arrangement of components that may be used for the first electronic component 220 of FIG. 2. Components and possible material types of each component are illustrated. For example, a frame may be used with thin cosmetic covers that may be metal or thin plastic with non-conductive coatings. The frame may be metal or plastic with a cosmetic overmold to match a flexible band, such as the flexible band 292 of FIG. 2. Snaps and/or hems may be used for assembly in some implementations.

Figure 22:
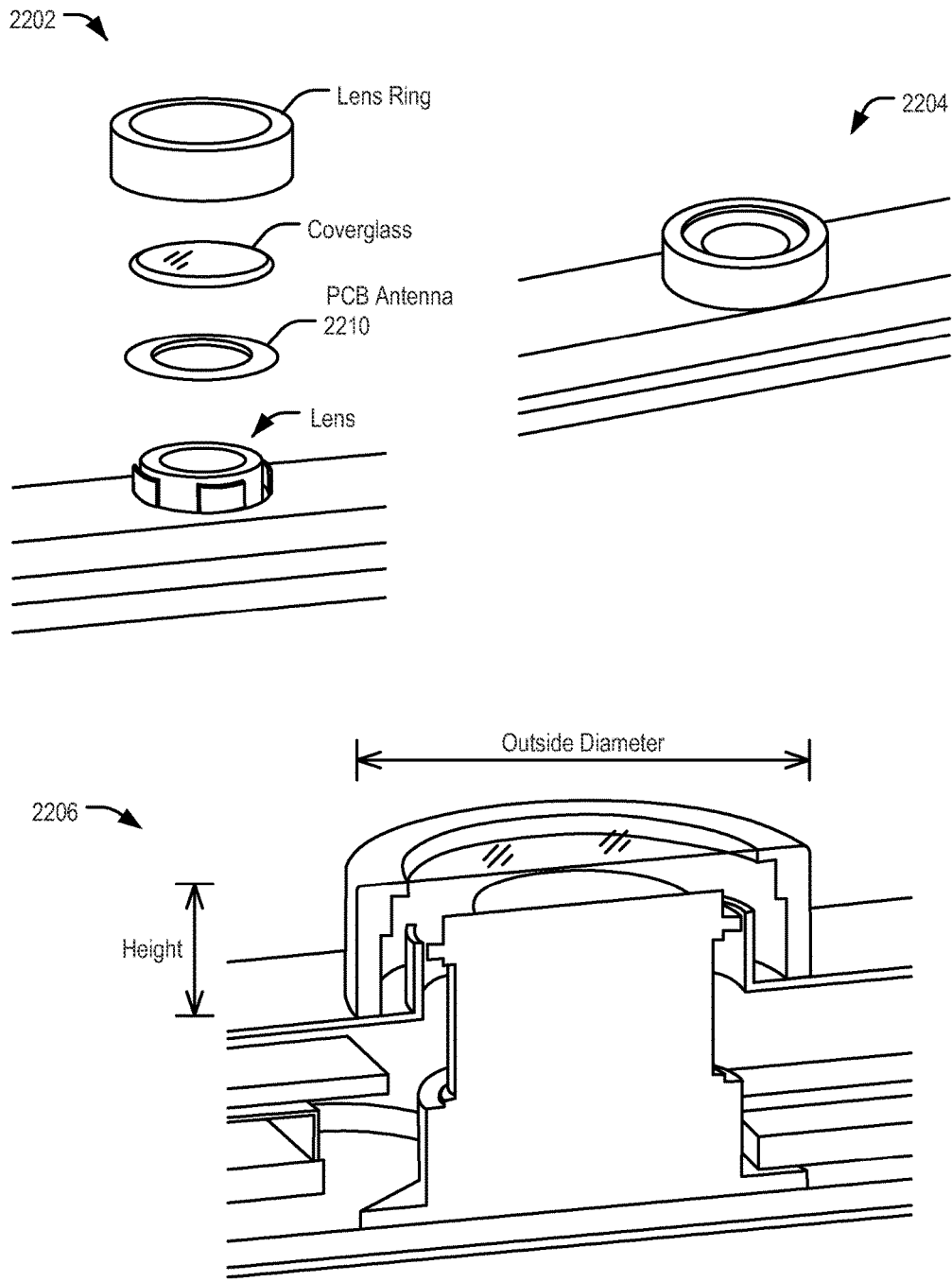
FIG. 22 is a diagram of several views of a particular illustrative embodiment of a lens systems of an electronic component of a modular fashion accessory.

FIG. 22 illustrates a first view 2202 that is an exploded view of components that may be used in a first antenna arrangement that may be used in the first electronic component 220 of FIG. 2. A PCB antenna 2210 may be included under a coverglass enclosed by, or at least partially enclosed by, a lens ring. A second view 2204 illustrates the components of the first view 2202 in an assembled arrangement. A third view 2206 is a cross-sectional view of the assembled arrangement of the second view 2204 indicating a height of the lens ring, such as a height of the lens protrusion 223 of FIG. 2, and an outside diameter of the lens ring, which may correspond to a largest lens feature visible to an observer of the modular fashion accessory. To mask or to hide visual features of the PCB antenna 2210, at least a portion of the coverglass may be back-painted to preserve a visual aesthetic presented to an observer of the stylish fashion accessory.

Figure 23:
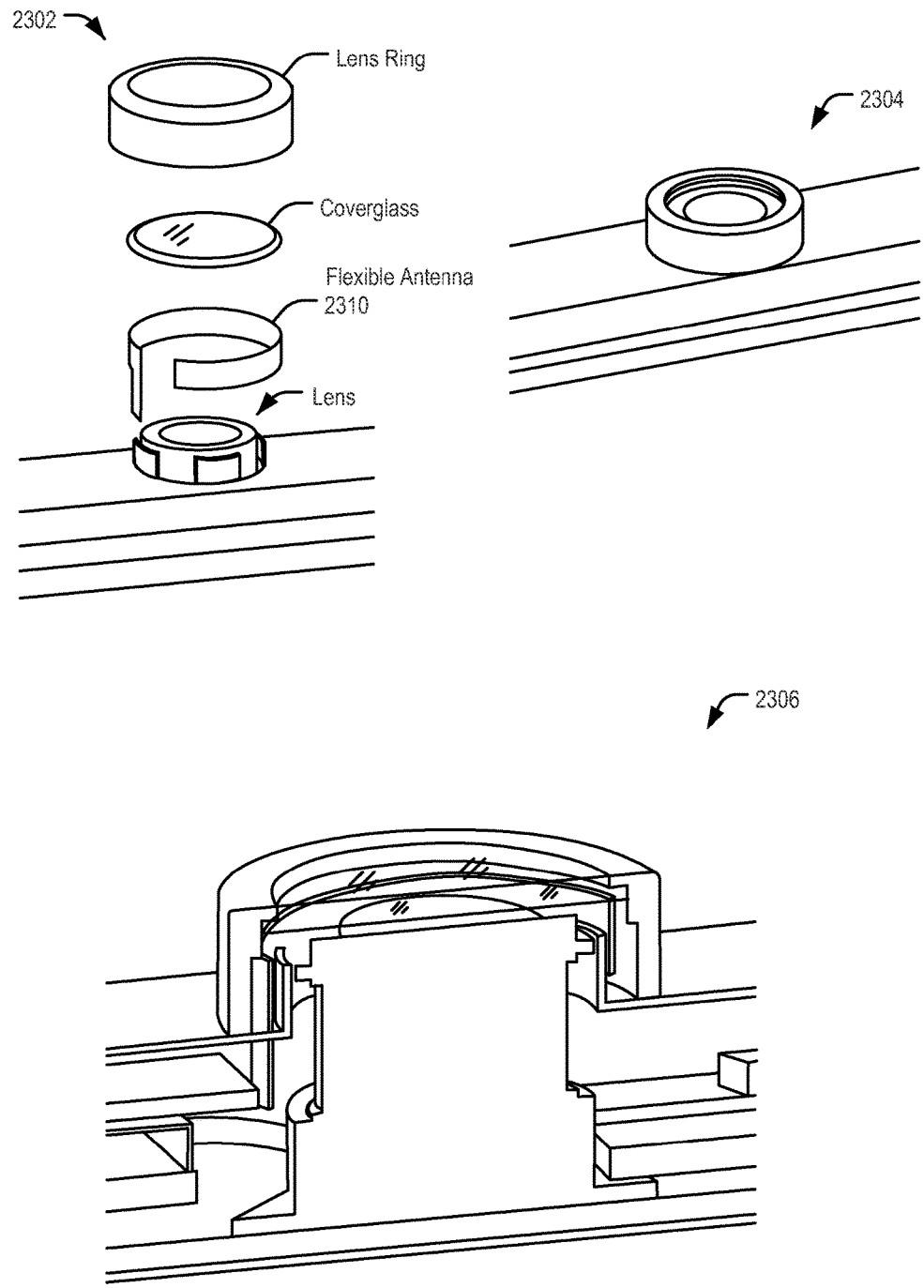
FIG. 23 is a diagram of several views of another particular illustrative embodiment of a lens systems of an electronic component of a modular fashion accessory.

FIG. 23 illustrates another antenna configuration that may be used in the first electronic component 220 of FIG. 2. In a first view 2302, a flexible antenna 2310 may be inserted between a lens and a coverglass and may be at least partially enclosed by a lens ring. A second view 2304 illustrates an assembled view of the components of the first view 2302. A third view 2306 illustrates a cross-section of the assembled view 2304. In the antenna configuration illustrated in FIG. 23, the flexible antenna 2310 may use a flexible PCB antenna, a sheet metal antenna, or a wire form antenna, as illustrative, non-limiting examples. The antenna 2310 may be attached via a coaxial wiring arrangement to the main PCB board, such as the main PCB illustrated in FIGS. 19-21. The coverglass may be back-painted to hide edges of the lens-module. In a particular example, an antenna length may be substantially 29 millimeters (mm) or an antenna width may be substantially 2 mm.

Figure 24:
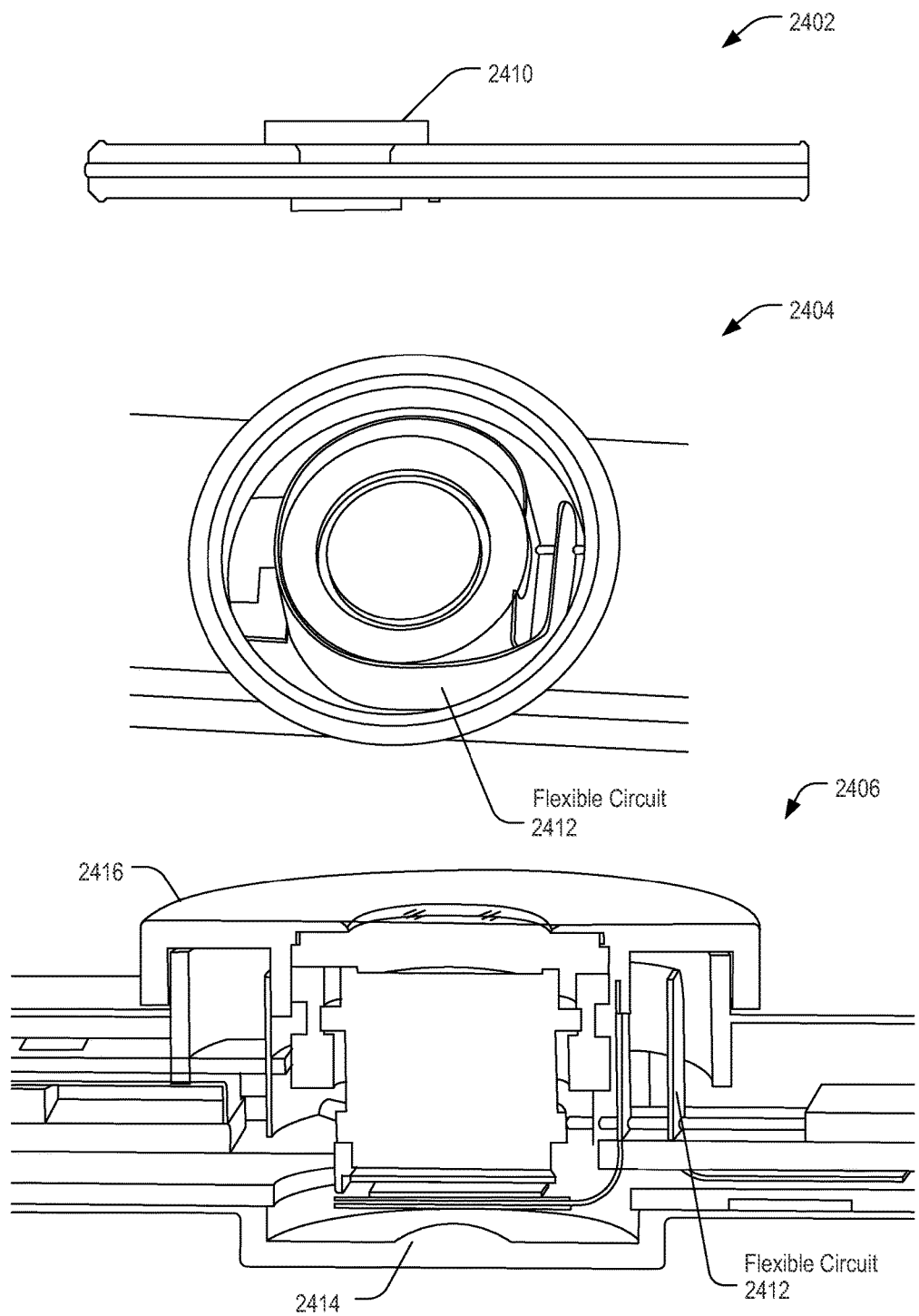
FIG. 24 is a diagram of several views of another particular illustrative embodiment of a lens systems of an electronic component of a modular fashion accessory.

Referring to FIG. 24, a rotating lens configuration is depicted in a first view 2402, a second view 2404, and a third view 2406. The first view 2402 is a side elevational view showing a rotatable lens cover 2410. The second view 2404 illustrates a partial perspective view into an interior of the lens cover 2410 and showing a flex circuit 2412 that at least partially encircles a camera lens mechanism and is at least partially enclosed by a lens ring, such as the lens ring illustrated in FIGS. 22 and 23. The third view 2406 illustrates a cross-sectional view of the first view 2402 or the second view 2404 and depicts a rotational structure 2414 and the flex circuit 2412. The lens cover 2416 may have a waterproof interface and rotational structure. As illustrated, rotation of the lens cover 2416 may enable rotation of a lens and/or an image sensor of the camera module which may remain electrically coupled to a main PCB board via an extension or flexation of the flex circuit 2412.

Figure 25:
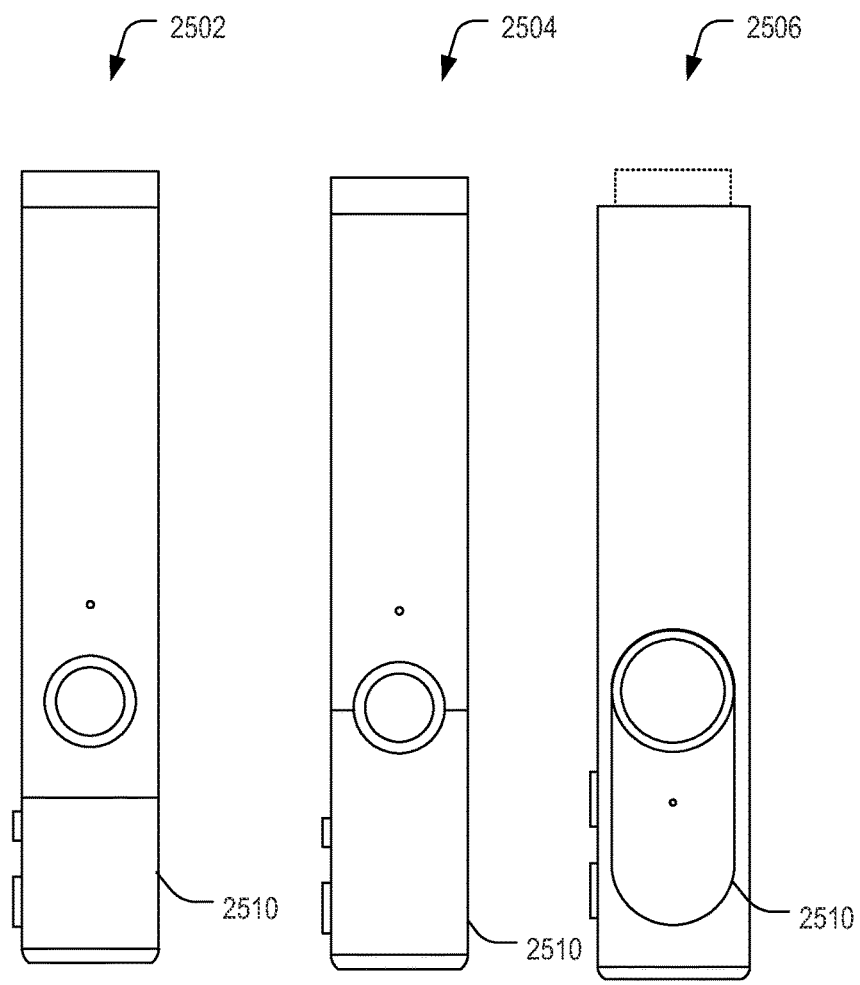
FIG. 25 is a diagram of several particular illustrative embodiments of an electronic component of a modular fashion accessory.

FIG. 25 depicts a first embodiment 2502, a second embodiment 2504, and a third embodiment 2506 of the first electronic component 220 of FIG. 2. In the first embodiment 2502, a RF transmission window 2510 (e.g., a Wi-Fi window formed of a plastic material that covers an opening in a housing of the first electronic component 220) has a first configuration and is positioned between the camera (e.g., adjacent to a lens ring) and an end of the first electronic component 220. In the second embodiment, the RF transmission window 2510 has a second configuration and extends from approximately a midpoint of the camera (or lens ring) to the end of the first electronic component 220. In the third embodiment, the RF transmission window 2510 has a third configuration and extends from the camera (or lens ring) toward the end of the first electronic component 220.

Figure 26:
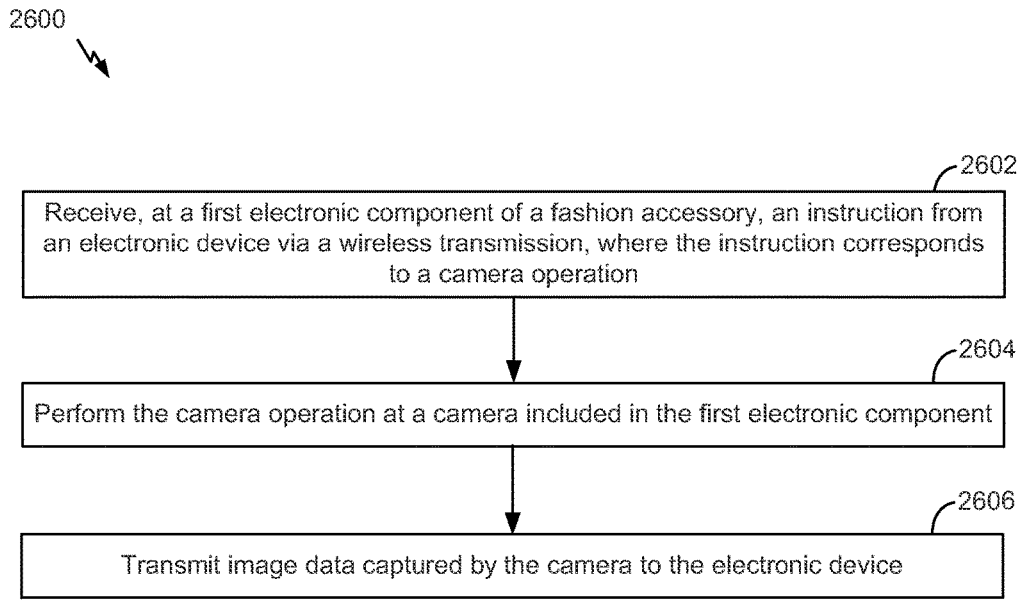
FIG. 26 is a flow diagram that illustrates a particular example of a method of operation of a component of a fashion accessory.

Referring to FIG. 26, a particular illustrative embodiment of a method is depicted and generally designated 2600. The method 2600 may be performed at an electronic component, such as one or more electronic components of a fashion accessory. For example, the method 2600 may be performed by the camera module 106 of FIG. 1, the first electronic component 220 of FIG. 2, a processor or circuitry of a modular fashion accessory including a camera device that is configured to execute instructions, or a combination thereof, as illustrative, non-limiting examples.

The method 2600 includes receiving, at a first electronic component of a fashion accessory, an instruction from an electronic device via a wireless transmission, at 2602. The fashion accessory may be a wearable item, such as one or more of the wearable items depicted in FIGS. 1-5 and 11. The instruction may correspond to a camera operation. The electronic device may include or correspond to the electronic device 144 of FIG. 1. The method 2600 also includes performing the camera operation at a camera included in the first electronic component, at 704. For example, the camera may include or correspond to the camera 222 of FIG. 2.

The fashion accessory may include a wearable item, such as a necklace, a bracelet, a clip, a keychain-style purse accessory, or a combination thereof, as illustrative, non-limiting examples. The fashion accessory may include the first electronic component, a second electronic component, and a connecting element configured to be coupled to the first electronic component and the second electronic component. In some implementations, the second electronic component may include an energy storage component, such as the battery 264 and or the battery 266 of the second electronic component 260 of FIG. 2, as illustrative, non-limiting examples. The connecting element may include or correspond to the connecting element 280 of FIG. 2 as an illustrative, non-limiting example. In some implementations, the connecting element may include a flexible band. Additionally or alternatively, the connecting element may be configured to electrically couple the first electronic component to the second electronic component.

In some implementations, performing the camera operation may include transmitting image data captured by the camera to the electronic device, at 2606. The image data may be transmitted by the first electronic component while the first electronic component is coupled via the flexible band to the second electronic component of the fashion accessory. In other implementations, the image data may be transmitted by the first electronic component while the first electronic component is coupled to a first connector of a charging device. For example, the first connector and the charging device may include the first connector 710 and the charging device 704, respectively, of FIG. 7. The charging device may be configured to provide power to the first electronic component. For example, the charging device may provide power to the first electronic component via the first connector when the first electronic device is coupled to the first connector. Additionally or alternatively, the charging device may be configured to provide power to the second electronic component of the fashion accessory. For example, the charging device may provide power to the second electronic component via a second connector, such as the second connector 712 of FIG. 7, of the charging device when the second electronic device is coupled to the second device. In a particular implementation, the charging device may be configured to provide power wirelessly to the first electronic component and/or the second electronic component.

The method 2600 may enable control via a remote device of one or more operations of a camera in a fashion accessory. For example, a user may control camera operations via interaction with an application running at a mobile device, such as a phone or tablet computer, that is in communication with one or more components of the fashion accessory via a wireless network. To illustrate, a user may control camera operations while wearing the fashion accessory (e.g., to adjust a camera focus) or while remote from the fashion accessory (e.g., using the nanny-cam mode described with respect to FIG. 7).

Figure 27:
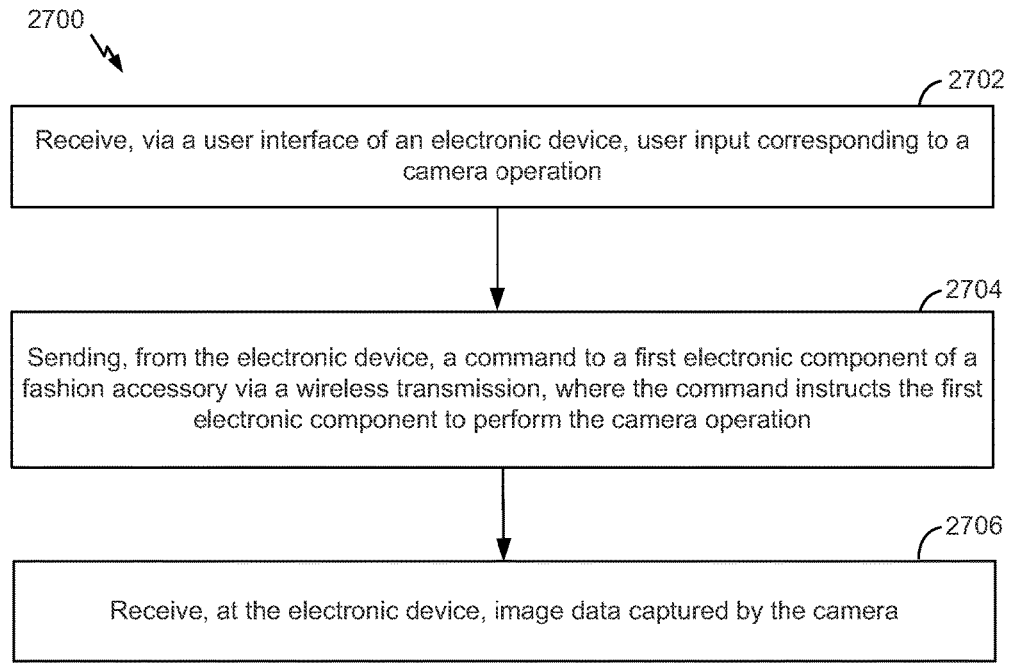
FIG. 27 is a flow diagram that illustrates a particular example of a method of operation of an electronic device in communication with a fashion accessory.

Referring to FIG. 27, a particular illustrative embodiment of a method is depicted and generally designated 2700. The method 2700 may be performed at an electronic device, such as the electronic device 144 of FIG. 1. For example, the method 2700 may be performed by the electronic device 144 of FIG. 1, a processor or circuitry configured to execute instructions, or a combination thereof, as illustrative, non-limiting examples.

The method 2700 includes receiving, via a user interface of an electronic device, user input corresponding to a camera operation, at 2702. The electronic device may include a mobile device and the user interface may correspond to a camera control application executing at the mobile device.

The method 2700 also includes sending, from the electronic device, a command to a first electronic component of a fashion accessory via a wireless transmission, at 2704. The command may instruct the first electronic component to perform the camera operation. The camera operation may include at least one of adjusting a camera setting, generating camera viewfinder image data, or activating or deactivating the camera, as illustrative, non-limiting examples.

The fashion accessory may include a wearable item, such as a necklace, a bracelet, a clip, a keychain-style purse accessory, or a combination thereof, as illustrative, non-limiting examples. The first electronic component may be coupled to a camera, such as the camera 222 of FIG. 2. In some implementations, the first electronic component may include the camera.

In some implementations, the method 2700 may include receiving, at the electronic device, image data captured by the camera, at 2706. The method 2700 may enable control, via a remote device, of one or more operations of a camera in a fashion accessory. For example, a user may control camera operations via interaction with an application running at a mobile device, such as a phone or tablet computer, electronic watch, or an electronic component in a vehicle, that is in communication with one or more components of the fashion accessory via a wireless network. To illustrate, a user may control camera operations while wearing the fashion accessory (e.g., to adjust a camera focus or a camera record mode) or while remote from the fashion accessory (e.g., using the nanny-cam mode described with respect to FIG. 7).

Figure 28:
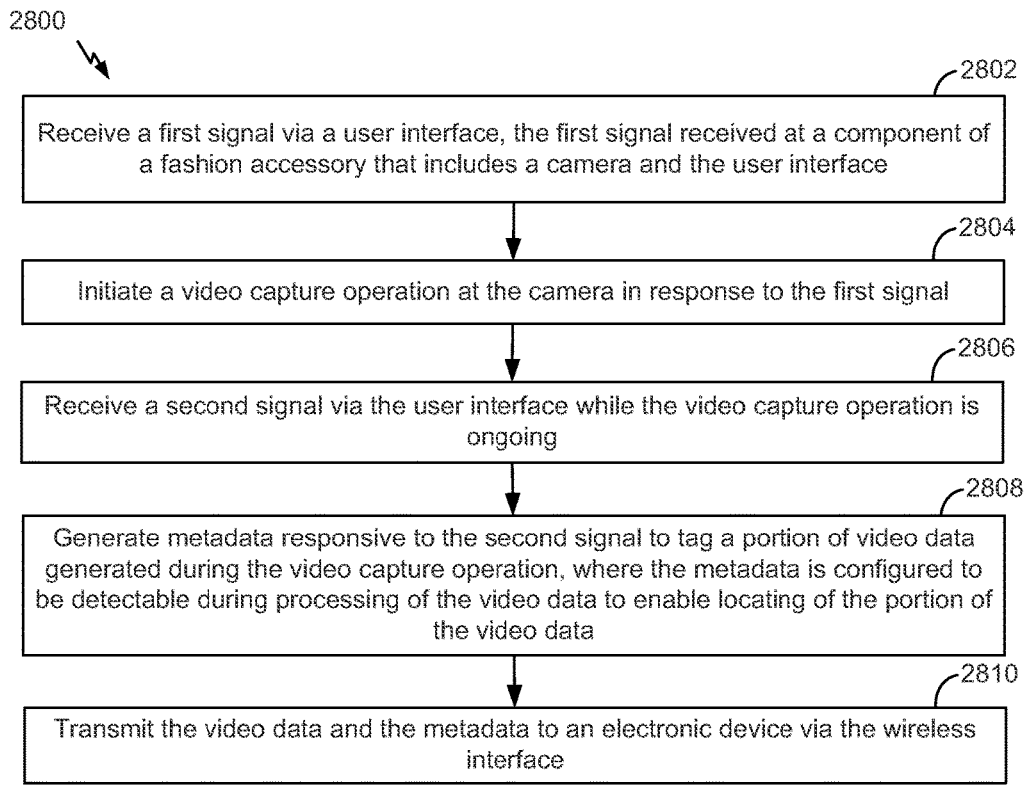
FIG. 28 is a flow diagram that illustrates another particular example of a method of operation of a component of a fashion accessory.

Referring to FIG. 28, a particular illustrative embodiment of a method is depicted and generally designated 2800. The method 2800 may be performed in a component within a fashion accessory. For example, the method 2800 may be performed by the camera module 106 of FIG. 1, the first electronic component 220 of FIG. 2, a processor or circuitry of a modular fashion accessory that includes a camera device and that is configured to execute instructions, or a combination thereof, as illustrative, non-limiting examples.

The method 2800 includes receiving a first signal via the user interface, at 2802. For example, the first signal may be generated by a component of the user interface 242 of FIG. 2. To illustrate, the first signal may be generated by the push/touch sensor 252 of FIG. 2 in response to a wearer of the fashion accessory touching the push/touch sensor 252 to initiate a video capture operation (e.g., to start a video recording at the camera 222).

A video capture operation is initiated at the camera in response to the first signal, at 2804. For example, the controller 226 may generate one or more control signals to cause the camera 222 to begin video recording responsive to receiving the first signal from the push/touch sensor 252.

A second signal is received via the user interface while the video capture operation is ongoing, at 2806. The second signal may be received from a touch sensor of the fashion accessory. For example, the second signal may be generated via a wearer's interaction with the user interface 242 of FIG. 2, such as via the user touching the touch sensor 250. The touch sensor 250 may generate the second signal responsive to detecting a touch event and may provide the second signal to the controller 226.

Metadata is generated responsive to the second signal to tag a portion of video data generated during the video capture operation, at 2808. The metadata is configured to be detectable during processing of the video data to enable locating of the portion of the video data. For example, the metadata may correspond to the metadata 239 of FIG. 2. The video data and the metadata may be stored at a memory device, such as the memory 232 of FIG. 2.

In some implementations, the fashion accessory includes a wireless interface, such as the wireless interface 228 of FIG. 2. The video data and the metadata may be transmitted to an electronic device via the wireless interface, at 2810.

For example, the video data and the metadata may be transmitted to the mobile device 144 of FIG. 1. To illustrate, the mobile device 144 may include one or more executable applications to enable processing of the video data and the metadata, such as a playback application and/or a video editing application. The metadata may be used during processing of the video data, such as to identify tagged portions of the video data for extraction as video clips. The mobile device 144 may be configured to enable sharing of the video data (e.g., after processing the video data), such as via one or more social networking applications or systems, and/or storage of the video data (e.g., via upload to a cloud-based storage and/or via download to a home network storage device or computer).

Figure 29:
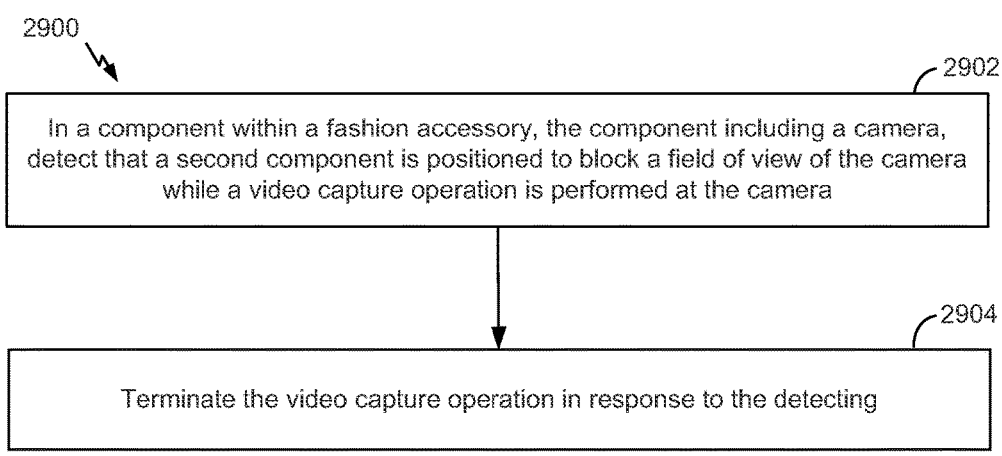
FIG. 29 is a flow diagram that illustrates another particular example of a method of operation of a component of a fashion accessory.

Referring to FIG. 29, a particular illustrative embodiment of a method is depicted and generally designated 2900. The method 2900 may be performed by a component within a fashion accessory. In an illustrative example, the fashion accessory may include a first electronic component, a second electronic component, and a connecting element. The first electronic component may include a camera. The fashion accessory may have a necklace configuration with a pendant. The first electronic component may be configured to attach to the second electronic component to form the pendant of the necklace, and the connecting element may be dimensioned to extend between the first and second electronic components and to wrap around the back of a wearer's neck. For example, the method 2900 may be performed by the camera module 106 of FIG. 1, by the first electronic component 220 in the wearable item 201 of FIG. 2, by a processor or circuitry of a modular fashion accessory that includes a camera device and that is configured to execute instructions, or a combination thereof, as illustrative, non-limiting examples.

The method 2900 includes performing, while a video capture operation is performed at the camera, detecting that the second electronic component is positioned to block a field of view of the camera, at 2902. For example, the second electronic component may have a shape or profile that is identifiable by an image processing component of the first electronic component (e.g., a processor in the controller 226 of FIG. 2) and/or may include a distinguishable marking or other feature that enables an image processor of the first electronic component to detect partial or total blocking of the camera's field of view by the second electronic component. The video capture operation is terminated in response to detection of the second electronic component positioned to block the field of view of the camera, at 2904.

For example, the first electronic component may have a first side that includes a camera lens and a second side that is opposite to the first side, such as the front side and the back side illustrated in the views 204, 202, respectively, of FIG. 2. The second electronic component is attachable to the second side of the first electronic component according to a first configuration of the pendant, such as the configuration of the pendant 290 that is illustrated in FIG. 2. The second electronic component may be attachable to the first side of the first electronic component according to a second configuration of the pendant. For example, a wearer of the fashion accessory may reconfigure the pendant 290 of FIG. 2 by detaching the second electronic component 260 from the back side of the first electronic component 220 and positioning the second electronic component 260 in front of the first electronic component 220 so that the second electronic component 260 blocks the camera 222. The resulting configuration of the pendant 290 may also have the cross-type shape with the first electronic component 220 angled relative to the second electronic component 260.

The method 2900 therefore enables a camera operation to be performed responsive to detecting a configuration or arrangement of the fashion accessory (e.g., by detecting that the camera is blocked). For example, a wearer may block the camera using the second electronic component to end or pause video recording, and may un-block the camera, such as by returning the fashion accessory to the configuration of the pendant 290 illustrated in FIG. 2, to begin or resume video recording. Blocking and un-blocking the camera may correspond to closing and opening a shutter of the camera, respectively, and in other implementations blocking and un-blocking the camera may be used to initiate and terminate still image capture instead of (or in addition to) video capture at the camera.

The method 2600 of FIG. 26, the method 2700 of FIG. 27, the method 2800 of FIG. 28, and/or the method 2900 of FIG. 29 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 2600 of FIG. 26, the method 2700 of FIG. 27, the method 2800 of FIG. 28, and/or the method 2900 of FIG. 29 can be initiated or controlled by one or more processors, such as one or more processors included in the controller 226 of FIG. 2 as an illustrative, non-limiting example.

Although certain other components (such as the controller 226, the battery and power management component 240, etc.) described herein are illustrated as block components and described in general terms, such components may include one or more microprocessors, state machines, and/or other circuits configured to enable the modular fashion accessory (or one or more components thereof, such as the first electronic component 220) to perform operations described herein. One or more components described herein may be operationally coupled using one or more nodes, one or more buses (e.g., data buses and/or control buses), one or more wires, one or more connectors, one or more wearable accessories, one or more other structures, or a combination thereof. One or more components described herein may include one or more physical components, such as hardware controllers, state machines, logic circuits, one or more other structures, or a combination thereof, to enable the modular fashion accessory with a camera device to perform one or more operations described herein. As an illustrative example, the controller 226 may include one or more microprocessors, state machines, circuits (e.g., logic circuits), one or more physical components, one or more other structures, or a combination thereof, as illustrative, non-limiting examples.

Alternatively or in addition, one or more aspects of the modular fashion accessory may be implemented using a microprocessor or microcontroller programmed (e.g., by executing instructions) to perform operations described herein, such as one or more operations of the method 2600 of FIG. 26, the method 2700 of FIG. 27, the method 2800 of FIG. 28, and/or the method 2900 of FIG. 29. In a particular embodiment, the modular fashion accessory includes a processor (such as the controller 226) executing instructions (e.g., firmware) retrieved from a memory (such as the memory 232). Alternatively or in addition, instructions that are executed by the processor may be retrieved from a separate memory location that is not part of the memory 232, such as at a read-only memory (ROM).

To further illustrate, the controller 226 may include a processor that is configured to execute instructions to perform certain operations described herein. The instructions may include general purpose instructions, and the processor may include a general purpose execution unit operable to execute general purpose instructions. The processor may access the instructions from the memory 232, another memory, or a combination thereof. The processor may execute the instructions to receive an instruction from an electronic device (such as the mobile device 144 of FIG. 1) via a wireless transmission. The instruction may corresponds to a camera operation. The processor may also execute the instructions to perform the camera operation using the camera 222 included in the first electronic component 220. For example, performing the camera operation may include transmitting image data captured by the camera to the electronic device. In other examples, the camera operation may include adjusting a camera setting, generating camera viewfinder image data, or activating or deactivating the camera, etc., as illustrative, non-limiting examples.

Although examples have been described with reference to a single camera (the camera 222), a single camera module (the first electronic component 220), and a single battery module (the second electronic component 260), it should be appreciated that structures and operations may be implemented using multiple cameras, multiple camera modules, multiple battery modules, or a combination thereof. As an example, a fashion accessory may include multiple camera modules connected to a single battery module or to multiple battery modules by a connecting element. In another example, a fashion accessory may include a single camera module connected to multiple battery modules by a connecting element. As yet another example, a fashion accessory may include multiple camera modules connected to a single battery module or to multiple battery modules by multiple connecting elements.

The memory 232 may be attached to or embedded within one or more host electronic components, such as within a housing of the first electronic component 220. However, in other embodiments, the memory 232 may be implemented in a portable device configured to be selectively coupled to one or more external devices, such as the first electronic component 220.

Although examples have been described with reference devices that include one or more components, it should be appreciated that each device may include more components or fewer components. For example, referring to FIG. 2, the first electronic component 220 may include one or more additional components, such as a display screen, another connector (e.g., a micro USB), a speaker, etc., as illustrative, non-limiting examples. Additionally or alternatively, the first electronic component 220 may not include one or more components depicted in FIG. 2, such as one or more devices of the user I/F 242 (e.g., the light emitter 244), the magnet 254, the microphone 224, or one or more other components of the first electronic component 220, as illustrative, non-limiting examples.

In some implementations, the memory 232 may include a memory device. The memory device may include a memory controller that is configured to communicate with the controller 226 of the first electronic component 220. The memory device may be included in the first electronic component 220 as embedded memory, such as in connection with an embedded MultiMedia Card (eMMC®) (trademark of JEDEC Solid State Technology Association, Arlington, Va.) configuration, as an illustrative example. The memory device may correspond to an eMMC device. As another example, the memory device may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The memory device may operate in compliance with a JEDEC industry specification. For example, the memory device may operate in compliance with a JEDEC eMMC specification, a JEDEC Universal Flash Storage (UFS) specification, one or more other specifications, or a combination thereof.

The memory 232 may include a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), a resistive random access memory (ReRAM), or a combination thereof. Alternatively or in addition, the memory 232 may include another type of memory. The memory 232 may include a semiconductor memory device.

In conjunction with the figures and descriptions, in a particular embodiment an apparatus is disclosed that comprises a first electronic component, a second electronic component, and a connecting element that is detachably connectable to the first electronic component and to the second electronic component. The first electronic component is connectable via the connecting element to the second electronic component to form a wearable item. At least one of the first electronic component or the second electronic component includes a camera. The wearable item may include a fashion accessory. A first exterior surface of the first electronic component may include a reflective material and the connecting element may include a flexible band. The reflective material may be metallic and the flexible band may include leather. Alternatively, or in addition, the flexible band may include another material, such as one or more elastomers.

In some aspects, the fashion accessory may be a necklace or may include a necklace. The first electronic component may be configured to attach to the second electronic component to form a pendant of the necklace. The flexible band may be dimensioned to wrap around a back of a neck of a wearer of the necklace and to suspend the pendant at a chest of the wearer. In some aspects, the fashion accessory includes a bracelet. In other aspects, the fashion accessory includes a clip or a keychain-style purse accessory.

The first electronic component may be configured to fasten to the second electronic component to form a cross-type shape. The first electronic component may be configured to fasten to the second electronic component such that an angle formed between the first electronic component and the second electronic component is less than 90 degrees.

In some aspects, the second electronic component may include a battery. In some aspects, the first electronic component includes a first connector, the second electronic component includes a second connector, and the connecting element includes: a third connector configured to couple to the first connector; a fourth connector configured to couple to the second connector; and a conductive wire or a conductive cable that may be configured to electrically couple the third connector to the fourth connector.

In some aspects, the first electronic component may be configured to couple to the second electronic component by connection of the first connector to the third connector and connection of the second connector to the fourth connector in a first configuration. The first electronic component may be configured to couple to the second electronic component by connection of the first connector to the second connector in a second configuration. In some aspects, the first electronic component may be configured to couple to the second electronic component by connecting the first connector to a fifth connector of a charging device and connecting the second connector to a sixth connector of the charging device. In some aspects, the charging device includes an alternating current (AC) plug, the fifth connector, and the sixth connector within a single housing.

The charging device may be configured to hold the first electronic component at an angle relative to vertical. The angle may substantially match an angular orientation of the camera.

In some aspects, the first electronic component may be configured to couple to the second electronic component by connecting the first connector and the second connector to an adapter that may be configured to hold the first electronic component and the second electronic component in an L-shaped configuration. In some aspects, the first connector includes a universal serial bus (USB)-type connector. In some aspects, the first electronic component includes a touch sensor. In some aspects, the touch sensor includes a capacitive sensor. In some aspects, the first electronic component may be configured to initiate an operation at the camera responsive to a signal from the touch sensor. In some aspects, the operation includes an image capture operation. In some aspects, the operation includes storage of captured image data received from the camera. The operation may include storing metadata associated with captured image data, the metadata identifying the captured image data as a keyframe. For example, the metadata may correspond to the metadata 239 of FIG. 2.

In some aspects, the first electronic component includes a first connector at a first end and a button at a second end. The button includes a capacitive touch sensor and may be configured to generate a first signal in response to detecting a touch at the button and to generate a second signal in response to detecting a push of the button. The first electronic component may be configured to perform a first operation in response to the first signal and to perform a second operation in response to the second signal.

In some aspects, the first electronic component includes a light emitting device. The light emitting device may include a light ring. The light emitting device may be configured to provide visual information regarding operation of the first electronic component.

The first electronic component may be configured to deactivate the camera in response to the second electronic component covering the camera.

The first electronic component may be configured to magnetically attach to the second electronic component. In some aspects, at least one of the first electronic component or the second electronic component includes a magnet having a shape and magnetic poles arranged to maintain a particular angle between a housing of the first electronic component and a housing of the second electronic component during use of the wearable item in a first configuration. In some aspects, the shape and magnetic poles of the magnet are arranged to maintain the housing of the first electronic component substantially parallel to the housing of the second electronic component during use of the wearable item in a second configuration.

In some aspects, the first electronic component includes a power button. In some aspects, the first electronic component includes a video capture button. In some aspects, the first electronic component includes a capacitive touch sensor and may be configured to insert a tag into a video data stream responsive to a signal from the capacitive touch sensor. In some aspects, the first electronic component includes an antenna and a radio-frequency transmission window that at least partially encloses the antenna and that includes the capacitive touch sensor.

The connecting element may include a rigid material. Alternatively, the connecting element may include a semi-rigid material. Alternatively, the connecting element may include a flexible material.

The connecting element may include a pressure sensor and the first electronic component may be configured to initiate a camera operation in response to receiving a signal from the pressure sensor.

A lens of the camera may be rotatable relative to a body of the first electronic component. The first electronic component may include the camera and the camera may include a lens housing projecting from the first electronic component. An antenna may be at least partially enclosed by the lens housing.

The connecting element may include a first latching element at a first end, and the first latching element may be configured to engage a first receptacle of the first electronic component to retain the first electronic component. The connecting element further may include a second latching element at a second end opposite the first end, and the second latching element may be configured to engage a second receptacle of the second electronic component to retain the second electronic component. The first latching element may include a color-coded indicator to visually distinguish a latched state of the first latching element from an unlatched state of the first latching element. The first latching element may be configured to automatically engage the first receptacle when the first electronic component is coupled to the connecting element.

The first electronic component or the second electronic component may include an antenna and may include communication circuitry configured to wirelessly transfer media data from the wearable item to an electronic device. The media data may include image data captured by the camera, audio data captured by a microphone, or a combination thereof. The communication circuitry may be configured to receive control data from the electronic device and to provide the control data to a controller. The controller may be configured to control operation of the camera responsive to the control data.

In some aspects, a connecting element of a wearable item includes: a first connector configured to detachably couple to a first electronic component; a second connector configured to detachably couple to a second electronic component; a cover coupled to the first connector and to the second connector; and wiring coupling the first connector to the second connector. The wiring may be routed through the cover. The wiring may enable a power source of the second electronic component to provide power to the first electronic component while the first electronic component is coupled to the first connector and the second electronic component is coupled to the second connector.

The connecting element may also include a first latching element associated with a first connector. The first latching element may be configured to engage a first receptacle of the first electronic component to retain the first electronic component. The connecting element may include a second latching element associated with a second connector. The second latching element may be configured to engage a second receptacle of the second electronic component to retain the second electronic component. The first connector may include a universal serial bus (USB)-type connector.

The connecting element may have a length defined by a distance between the first connector and the second connector along the cover, and the length may be dimensioned to enable wrapping the cover around a back of a neck of a wearer to suspend the first electronic component and the second electronic component at a chest of the wearer. In another aspect, the connecting element may have a length defined by a distance between the first connector and the second connector along the cover, and the length may be dimensioned to enable clipping the first electronic component and the second electronic component to an article of clothing or an accessory of a wearer. The cover may include a curve between the first connector and the second connector, such as depicted in FIG. 10. The curve may be dimensioned to cause the first electronic component to have a particular angle relative to the second electronic component when the first electronic component is coupled to the first connector and the second electronic component is coupled to the second connector.

The cover may include a bend between the first connector and the second connector. The bend may be dimensioned to cause the first electronic component to be substantially parallel to the second electronic component when the first electronic component is coupled to the first connector and the second electronic component is coupled to the second connector.

In some aspects, a wearable electronic component includes: a charge (or energy) storage component; a decorative housing at least partially enclosing the charge storage component; and a connector configured to be detachably coupled to a wearable camera component via a wearable connecting element to provide charge (or power) from the charge storage component to the wearable camera component. The connector may be configured to be detachably coupled to a charging device to replenish (e.g., charge) the charge (or energy) storage component.

The connector may be configured to be detachably coupled to the wearable camera component via a second wearable connecting element, the second wearable connecting element having a second physical configuration distinct from a first physical configuration of the wearable connecting element. The connector may include a universal serial bus (USB)-type connector.

In some aspects, a wearable electronic component includes: a connector configured to be detachably coupled to a power source via a wearable connecting element; a camera; communication circuitry configured to enable transmission of image data captured by the camera to a remote device; and a decorative housing at least partially enclosing the camera and the communication circuitry. The connector may be configured to be detachably coupled to the power source via a second wearable connecting element, the second wearable connecting element having a second physical configuration distinct from a first physical configuration of the wearable connecting element.

A lens of the camera may be rotatable relative to the decorative housing. An antenna may be coupled to the communication circuitry. The antenna may be at least partially enclosed by a lens housing of the camera. The decorative housing may include a transmission window, and the antenna may be disposed within the decorative housing behind the transmission window.

A controller may be coupled to the camera. The communication circuitry may be configured to receive control data from the remote device via a wireless transmission and to provide the control data to the controller. The controller may be configured to control operation of the camera responsive to the control data.

The wearable electronic component may also include a memory to store image data capture by the camera. The wearable electronic component may also include a touch sensor. The touch sensor may include a capacitive sensor. The wearable electronic component may also include the controller that may be configured to initiate an operation at the camera responsive to a detection signal from the touch sensor.

The connector may be at a first end of the decorative housing. A button may be at a second end of the decorative housing. The second end may be opposite the first end. The button may include a capacitive touch sensor and may be configured to send a first signal to the controller in response to detecting a touch at the button and to send a second signal to the controller in response to detecting a push of the button. The controller may be may be configured to perform a first operation in response to the first signal and to perform a second operation in response to the second signal.

The wearable electronic component may also include a light emitting device. The light emitting device may include a light ring.

In some aspects, an apparatus includes: charging circuitry; a first connector coupled to the charging circuitry and configured to provide power to a first electronic component while the first electronic component may be coupled to the first connector; and a second connector coupled to the charging circuitry and configured to provide power to a second electronic component while the second electronic component is coupled to the first connector. The first electronic component may include a camera and the first connector may be configured to provide sufficient power to the first electronic component to enable operation of the camera. The second electronic component may include a rechargeable battery.

The apparatus may include an alternating current (AC) plug and a single housing that at least partially encloses the AC plug, the first connector, and the second connector. The first connector may be configured to hold the first electronic component at an angle relative to vertical that substantially matches an angular orientation of the camera. The charging circuitry may be configured to provide power to the first electronic component concurrently with providing power to the second electronic component to enable operation of the camera while the rechargeable battery is being charged.

In some aspects, a method includes: receiving, at a first electronic component of a fashion accessory, an instruction from an electronic device via a wireless transmission, the instruction corresponds to a camera operation; and performing the camera operation at a camera included in the first electronic component.

Performing the camera operation may include transmitting image data captured by the camera to the electronic device. The image data may be transmitted by the first electronic component while the first electronic component is coupled via a flexible band to a second electronic component of the fashion accessory. The image data may be transmitted by the first electronic component while the first electronic component may be coupled to a first connector of a charging device that provides power to the first electronic component and to a second electronic component of the fashion accessory that may be coupled to a second connector of the charging device.

The electronic device may include a mobile device and the instruction may be received from a camera control application executing at the mobile device. The camera operation may include at least one of adjusting a camera setting, generating camera viewfinder image data, or activating or deactivating the camera.

In some aspects, a method includes: receiving, via a user interface of an electronic device, user input corresponding to a camera operation; and sending, from the electronic device, a command to a first electronic component of a fashion accessory via a wireless transmission. The command instructs the first electronic component to perform the camera operation. The electronic device may include a mobile device and the user interface may correspond to a camera control application executing at the mobile device.

The method may include receiving, at the electronic device, image data captured by the camera. The image data may be received from the first electronic component while the first electronic component is coupled via a flexible band to a second electronic component of the fashion accessory. Alternatively, the image data may be received from the first electronic component while the first electronic component is coupled to a first connector of a charging device that provides power to the first electronic component and to a second electronic component of the fashion accessory that may be coupled to a second connector of the charging device. The camera operation may include at least one of adjusting a camera setting, generating camera viewfinder image data, or activating or deactivating the camera.

Modular fashion accessories, as described herein, may include semiconductor memory devices, such as the memory 232 of FIG. 2 or the memory 1718 of FIG. 17 as non-limiting examples. The semiconductor memory devices may include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices (e.g., the memory 232 or the memory 1718) can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. For example, semiconductor memory elements of the memory 232 or the memory 1718 may be arranged in two or three dimensions. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices (e.g., the memory 232 or the memory 1718) may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant structures within the scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising;
a first electronic component that includes a camera, a first connector at a first end and a button at a second end, wherein the button includes a capacitive touch sensor and is configured to generate a first signal in response to detecting a touch at the button and to generate a second signal in response to detecting a push of the button, and wherein the first electronic component is configured to perform a first operation in response to the first signal and to perform a second operation in response to the second signal;
a second electronic component that includes an energy storage component; and
a connecting element that is detachably connectable to the first electronic component and to the second electronic component, wherein the first electronic component is connectable via the connecting element to the second electronic component to form a wearable item, and wherein the first electronic component is further configured to receive power from the second electronic component via the connecting element.

2. The apparatus of claim 1, wherein the wearable item includes a fashion accessory.

3. The apparatus of claim 2, further comprising a flexible band, wherein the fashion accessory includes a necklace with a pendant and with the flexible band, and wherein the first electronic component is further configured to attach to the second electronic component to form the pendant of the necklace.

4. The apparatus of claim 1, wherein the first electronic component is further configured to fasten to the second electronic component to form a cross-type shape.

5. The apparatus of claim 4, wherein the first electronic component is further configured to fasten to the second electronic component, and wherein the first electronic component and the second electronic component are angled relative to each other if the first electronic component is fastened to the second electronic component.

6. The apparatus of claim 5, wherein an angle formed between the first electronic component and the second electronic component is less than 90 degrees.

7. The apparatus of claim 5, wherein an angle formed between the first electronic component and the second electronic component is substantially 60 degrees.

8. The apparatus of claim 1, wherein the second electronic component further includes a second connector, and wherein the connecting element includes:
a third connector configured to couple to the first connector;
a fourth connector configured to couple to the second connector; and
a conductive wire or a conductive cable, the conductive wire or the conductive cable configured to electrically couple the third connector to the fourth connector.

9. The apparatus of claim 1, wherein the first electronic component is further configured to initiate an operation at the camera responsive to the capacitive touch sensor.

10. The apparatus of claim 1, wherein the first electronic component further includes a light emitting device that is configured to provide visual information regarding operation of the first electronic component.

11. The apparatus of claim 1, wherein the first electronic component is further configured to magnetically attach to the second electronic component.

12. The apparatus of claim 1, wherein one of the first electronic component and the second electronic component further includes an antenna and communication circuitry configured to wirelessly transfer media data from the wearable item to an electronic device.

13. The apparatus of claim 12, wherein one of the first electronic component and the second electronic component further includes a microphone, and wherein the media data includes image data captured by the camera, audio data captured by the microphone, or a combination thereof.

14. The apparatus of claim 12, wherein the communication circuitry is further configured to receive control data from the electronic device and to provide the control data to a controller, and wherein the controller is configured to control operation of the camera responsive to the control data.

15. An apparatus comprising:
a first electronic component that includes a first connector and a button, wherein the button includes a touch sensor and is configured to generate a first signal in response to detecting a first touch input at the button and to generate a second signal in response to detecting a second touch input at the button, and wherein the first electronic component is configured to perform a first operation in response to the first signal and to perform a second operation in response to the second signal;
a second connector configured to detachably couple to the first electronic component;
a third connector configured to detachably couple to a second electronic component;
a cover coupled to the second connector and to the third connector, wherein the cover at least partially encloses the second connector and the third connector; and
wiring coupling the second connector to the third connector, the wiring routed through the cover, wherein the wiring enables a power source of the second electronic component to provide power to the first electronic component if the first electronic component is coupled to the second connector and if the second electronic component is coupled to the third connector.

16. The apparatus of claim 15, wherein the cover includes a curve between the second connector and the third connector, the curve dimensioned to cause the first electronic component to have a particular angle relative to the second electronic component if the first electronic component is coupled to the second connector and if the second electronic component is coupled to the third connector.

17. A wearable electronic component comprising:
an energy storage component;
a wearable camera component that includes a button at an end of the wearable camera component, wherein the button includes a capacitive touch sensor and is configured to generate a first signal in response to detecting a touch at the button and to generate a second signal in response to detecting a push of the button, and wherein the wearable camera component is configured to perform a first operation in response to the first signal and to perform a second operation in response to the second signal;
a decorative housing at least partially enclosing the energy storage component; and
a connector configured to be detachably coupled to the wearable camera component via a wearable connecting element to provide energy from the energy storage component to the wearable camera component, the connector further configured to be detachably coupled to a charging device to energize the energy storage component.

18. The wearable electronic component of claim 17, wherein the connector includes a universal serial bus (USB)-type connector.

19. A wearable electronic component comprising:
a connector configured to be detachably coupled to a power source via a wearable connecting element;
a camera;

communication circuitry configured to enable transmission of image data captured by the camera to a remote device;

a decorative housing at least partially enclosing the camera and the communication circuitry, wherein the connector is at a first end of the decorative housing; and a button that includes a capacitive touch sensor, wherein the button is configured to send a first signal to a controller in response to detecting a touch at the button and to send a second signal to the controller in response to detecting a push of the button, and wherein the controller is configured to perform a first operation in response to the first signal and to perform a second operation in response to the second signal.

20. The wearable electronic component of claim 19, further comprising an antenna coupled to the communication circuitry.

21. The wearable electronic component of claim 20, wherein the decorative housing includes a transmission window, wherein the antenna is disposed within the decorative housing behind the transmission window, and wherein at least a portion of the antenna is covered by the transmission window.

22. The wearable electronic component of claim 19, wherein the communication circuitry is further configured to receive control data from the remote device via a wireless transmission and to provide the control data to the controller, and wherein the controller is further configured to control operation of the camera responsive to the control data.

23. The wearable electronic component of claim 19, further comprising a memory configured to store image data captured by the camera.

24. A charging device comprising:
a housing;
charging circuitry disposed within the housing;
a first connector coupled to the charging circuitry and configured to provide power to a first electronic component external to the housing if the first electronic component is coupled to the first connector, wherein the first electronic component includes a camera, and wherein the first connector is further configured to provide power to the first electronic component to enable operation of the camera; and
a second connector coupled to the charging circuitry and configured to provide power to a second electronic component external to the housing if the second electronic component is coupled to the second connector, wherein the second electronic component includes a rechargeable battery and is configured to provide power to the first electronic component if the second electronic component is coupled to the first electronic component.

25. The charging device of claim 24, wherein the first connector is further configured to hold the first electronic component at an angle relative to a surface of the housing, and wherein the angle substantially matches an angular orientation of the camera.

26. The charging device of claim 24, wherein the charging circuitry is configured to provide power to the first electronic component concurrently with providing power to the second electronic component to enable operation of the camera if the rechargeable battery is being charged.

27. An apparatus comprising:
means for capturing images, the means for capturing images including means for capacitively sensing, means for connecting, and means for generating a first signal in response to detecting a touch and for generating a second signal in response to detecting a push, wherein the means for capturing images is configured to perform a first operation in response to the first signal and to perform a second operation in response to the second signal, wherein the means for connecting is positioned at a first end of the means for capturing images, and wherein the means for capacitively sensing is positioned at a second end of the means for capturing images;
means for supplying power to the means for capturing images; and
means for detachably connecting the means for capturing images to the means for supplying power to form a wearable item, wherein the means for capturing images is further configured to receive power from the means for supplying power via the means for connecting.

28. The apparatus of claim 27, wherein the means for detachably connecting includes means for flexibly connecting the means for capturing images to the means for supplying power.

29. An apparatus comprising:
a first electronic component including a camera;
a second electronic component including an energy storage component; and
a connecting element that includes a flexible band and that is detachably connectable to the first electronic component and to the second electronic component, wherein the first electronic component is connectable via the connecting element to the second electronic component to form a wearable item that includes a necklace with a pendant and with the flexible band, wherein the first electronic component is configured to receive power from the second electronic component via the connecting element, and wherein the first electronic component is further configured to attach to the second electronic component to form the pendant.

30. The apparatus of claim 29, wherein the flexible band is configured to extend between the first electronic component and the second electronic component.

31. An apparatus comprising:
a first electronic component including a camera;
a second electronic component including an energy storage component, wherein the first electronic component is configured to fasten to the second electronic component such that an angle formed between the first electronic component and the second electronic component is less than 90 degrees; and
a connecting element that is detachably connectable to the first electronic component and to the second electronic component, wherein the first electronic component is connectable via the connecting element to the second electronic component to form a wearable item, and wherein the first electronic component is further configured to receive power from the second electronic component via the connecting element.

32. The apparatus of claim 31, wherein the connecting element includes a flexible band configured to extend between the first electronic component and the second electronic component.

33. An apparatus comprising:
means for capturing images that includes means for sensing a touch input, wherein the means for sensing is configured to generate a first signal in response to detecting a first touch input at the means for sensing and to generate a second signal in response to detecting a second touch input at the means for sensing, and wherein the means for capturing images is configured to perform a first operation in response to the first signal and to perform a second operation in response to the second signal;

first means for connecting configured to detachably couple to the means for capturing images;

second means for connecting configured to detachably couple to means for providing power;

means for covering coupled to the first means for connecting and to the second means for connecting, wherein the means for covering at least partially encloses the first means for connecting and the second means for connecting; and means for electrically coupling the first means for connecting to the second means for connecting, the means for electrically coupling routed through the means for covering, wherein the means for covering enables the means for providing power to provide power to the means for capturing images if the means for capturing images is coupled to the first means for connecting and if the means for providing power is coupled to the second means for connecting.

34. The apparatus of claim 33, wherein the means for sensing is further configured to detect the first touch input and the second touch input using a capacitively sensing technique.

* * * * *